July 23, 1963

N. BREWER ETAL 3,098,498

PNEUMATIC CONTROLLERS

Filed June 8, 1953

INVENTORS
NATHANIEL BREWER
EDMUND D. HAIGLER
EDWARD D. WOODRING

BY

Leonard L. Kalish
ATTORNEY

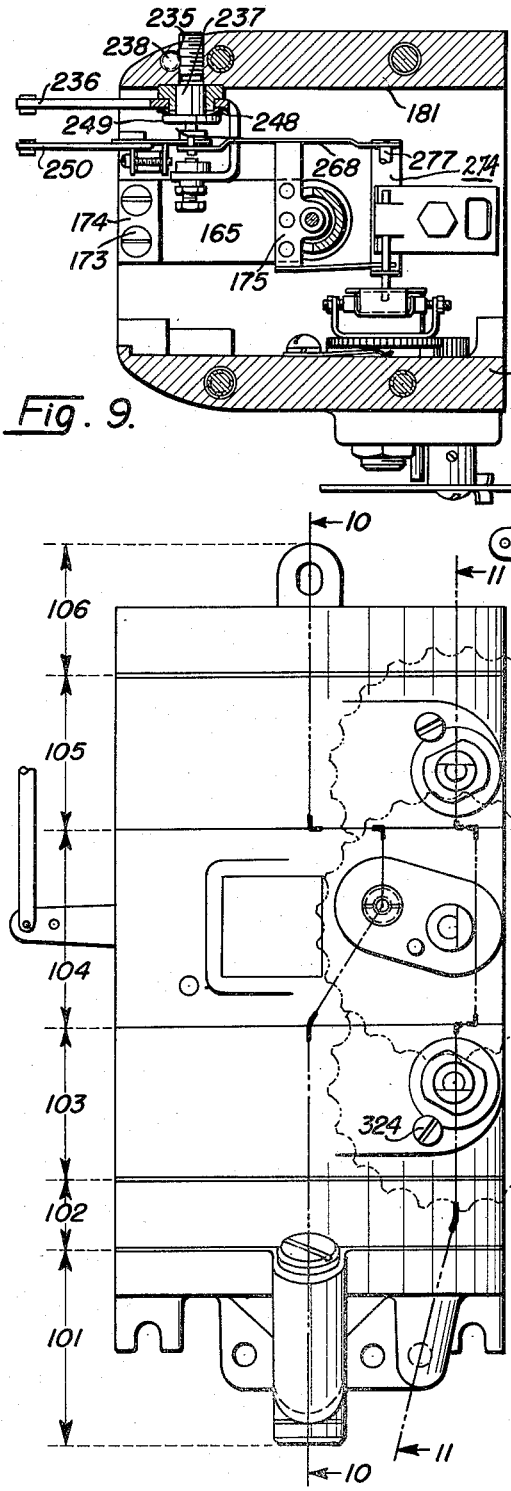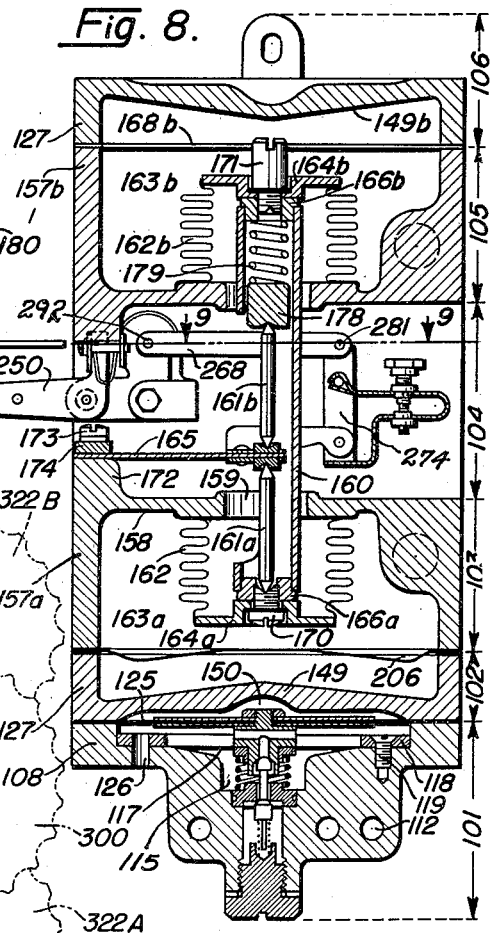

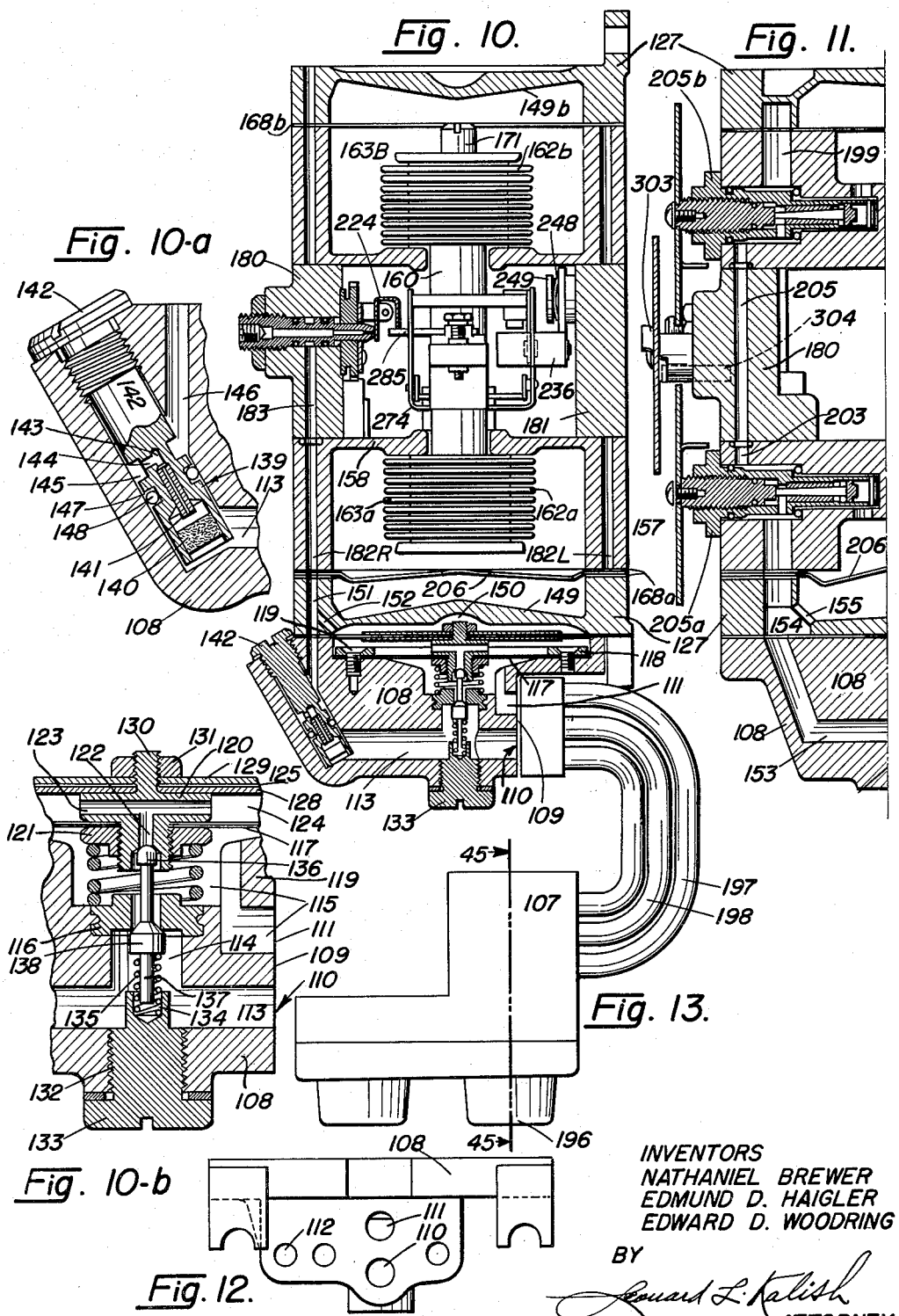

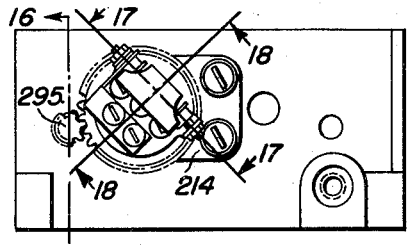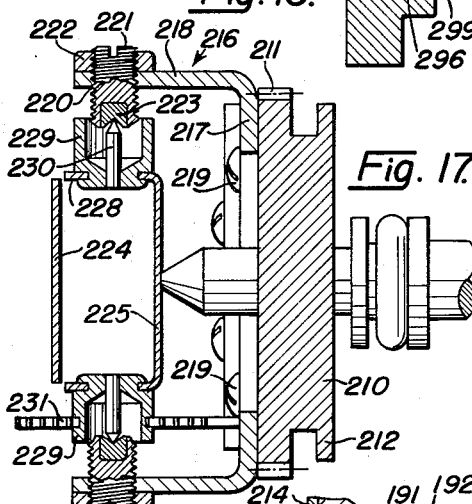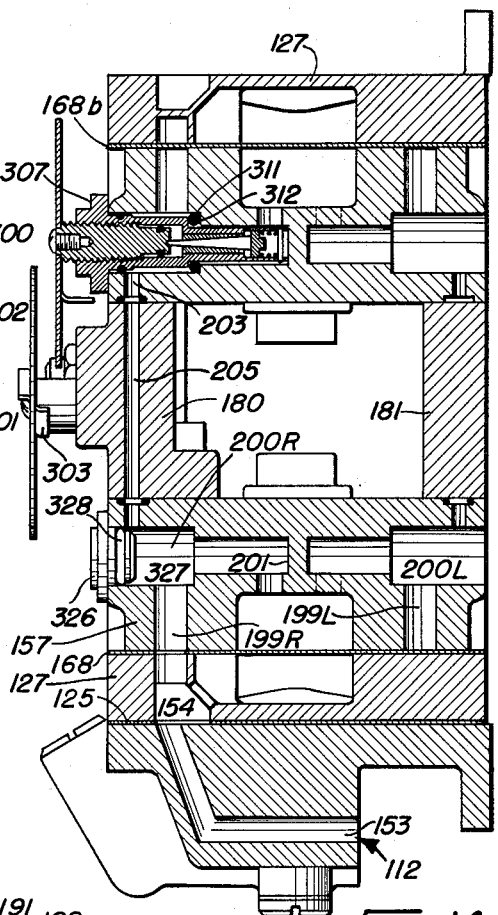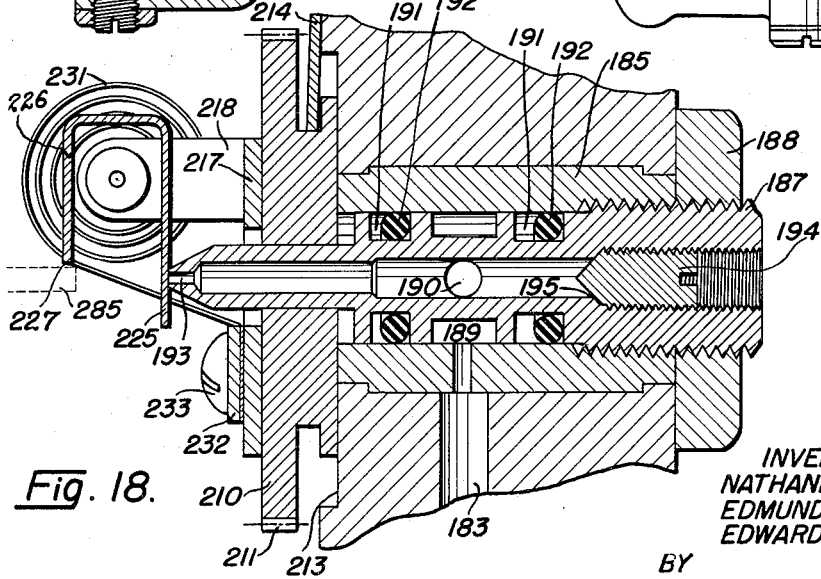

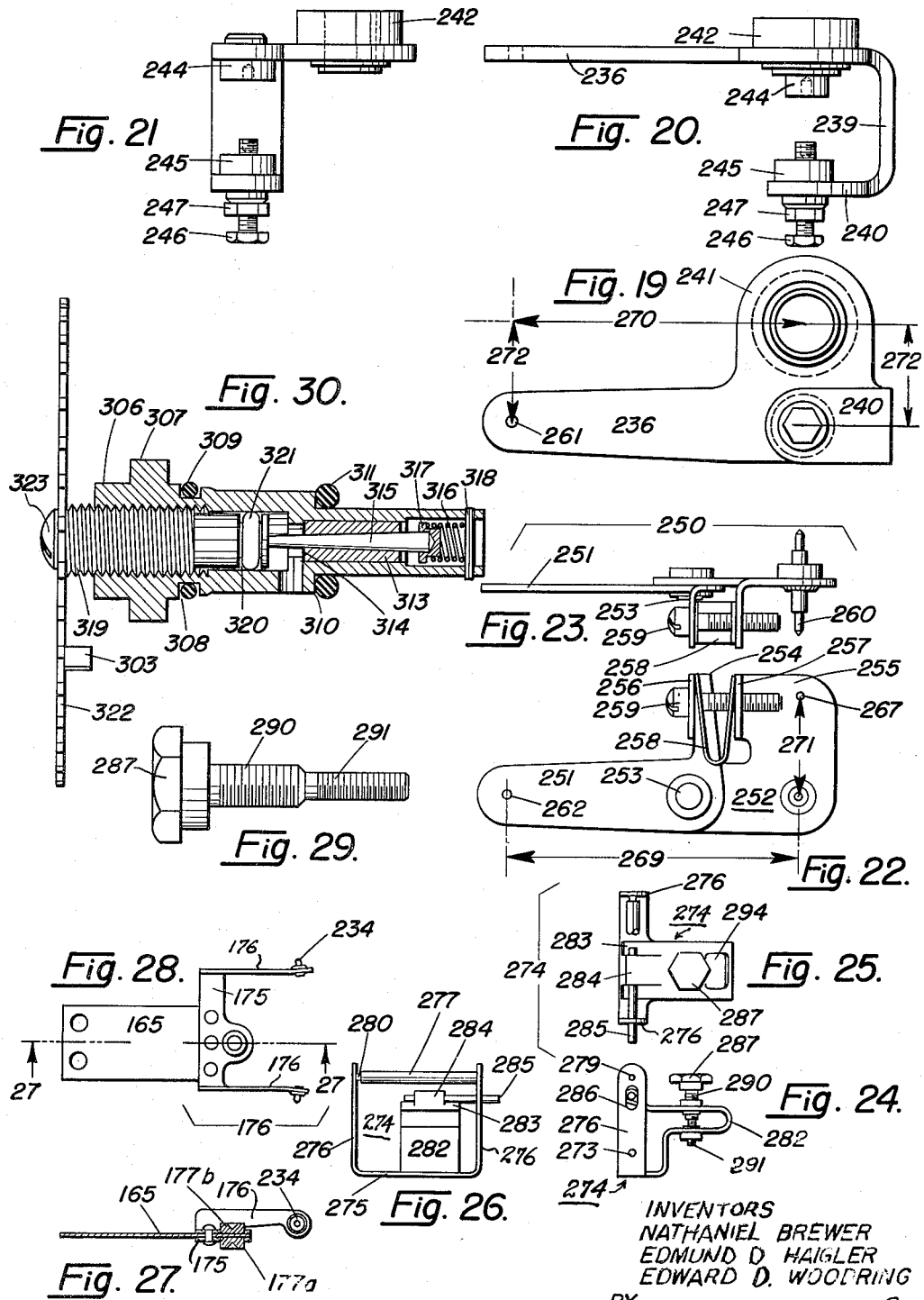

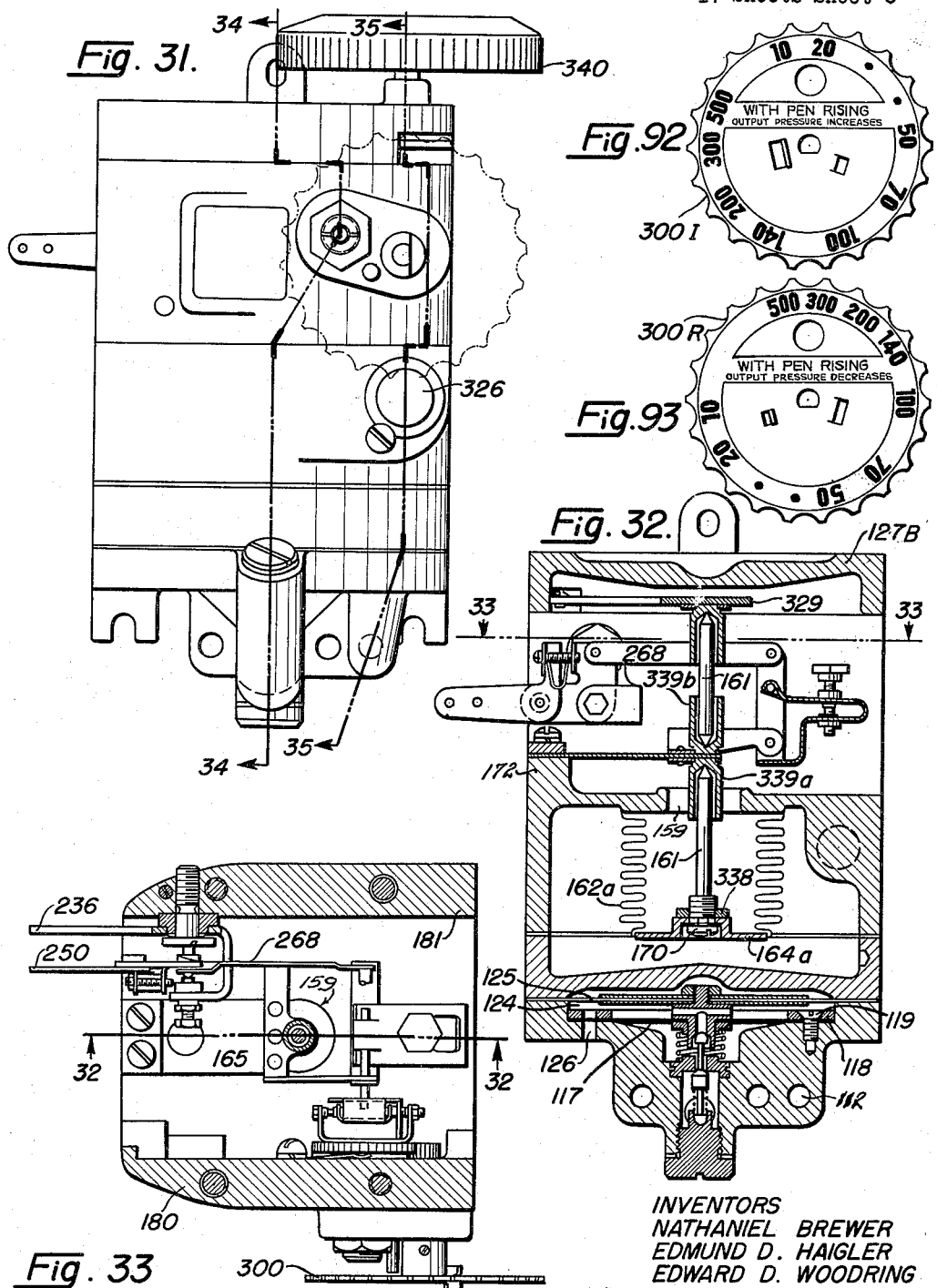

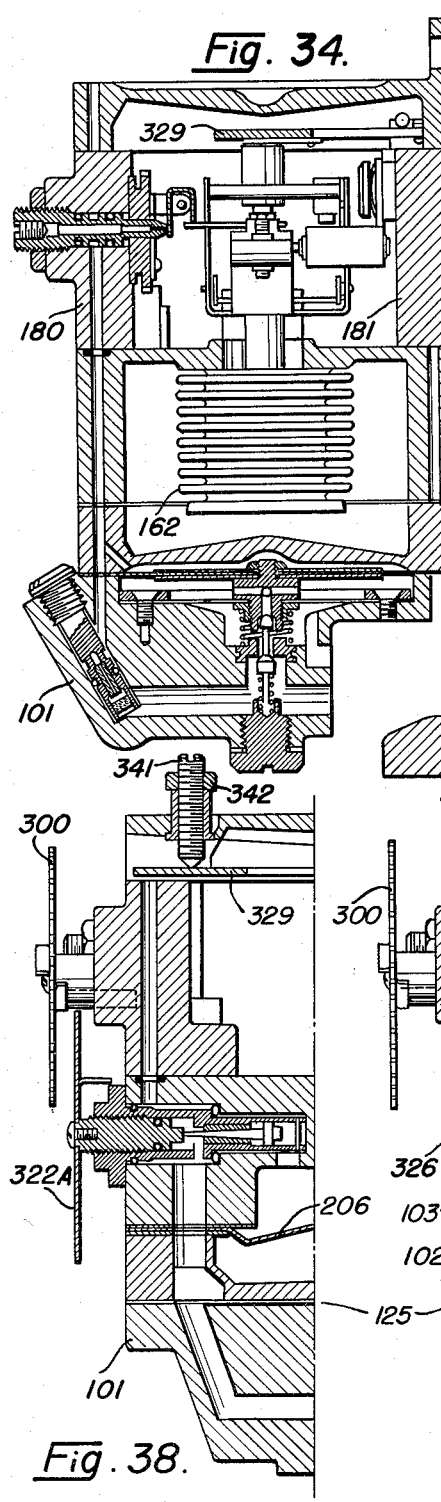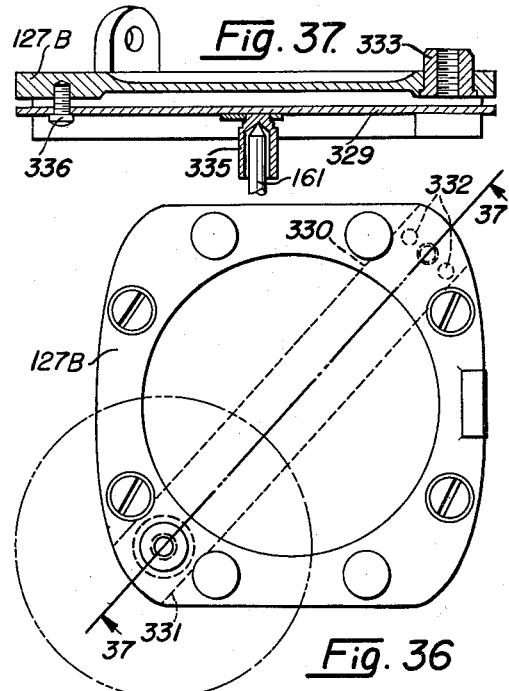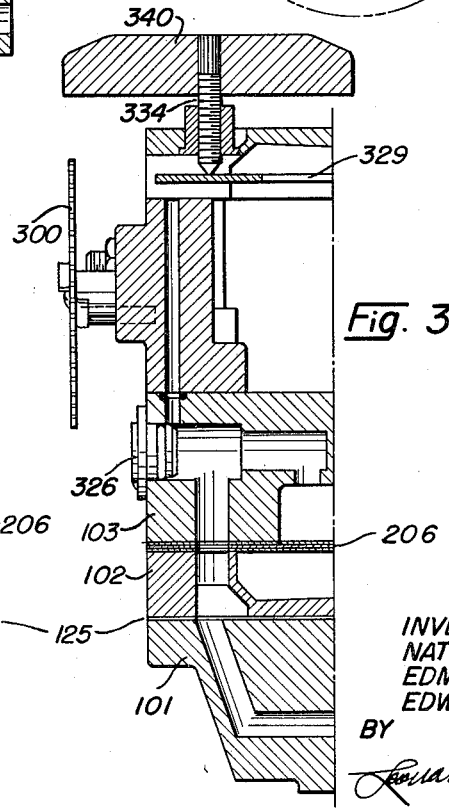

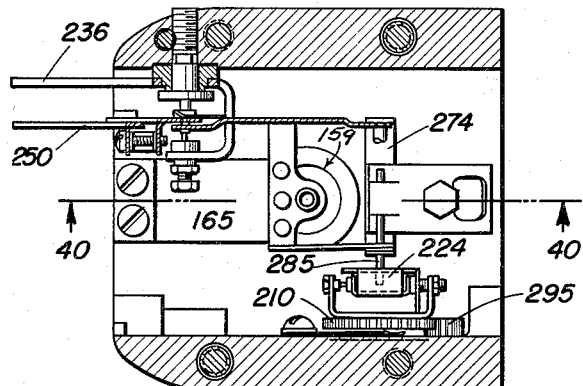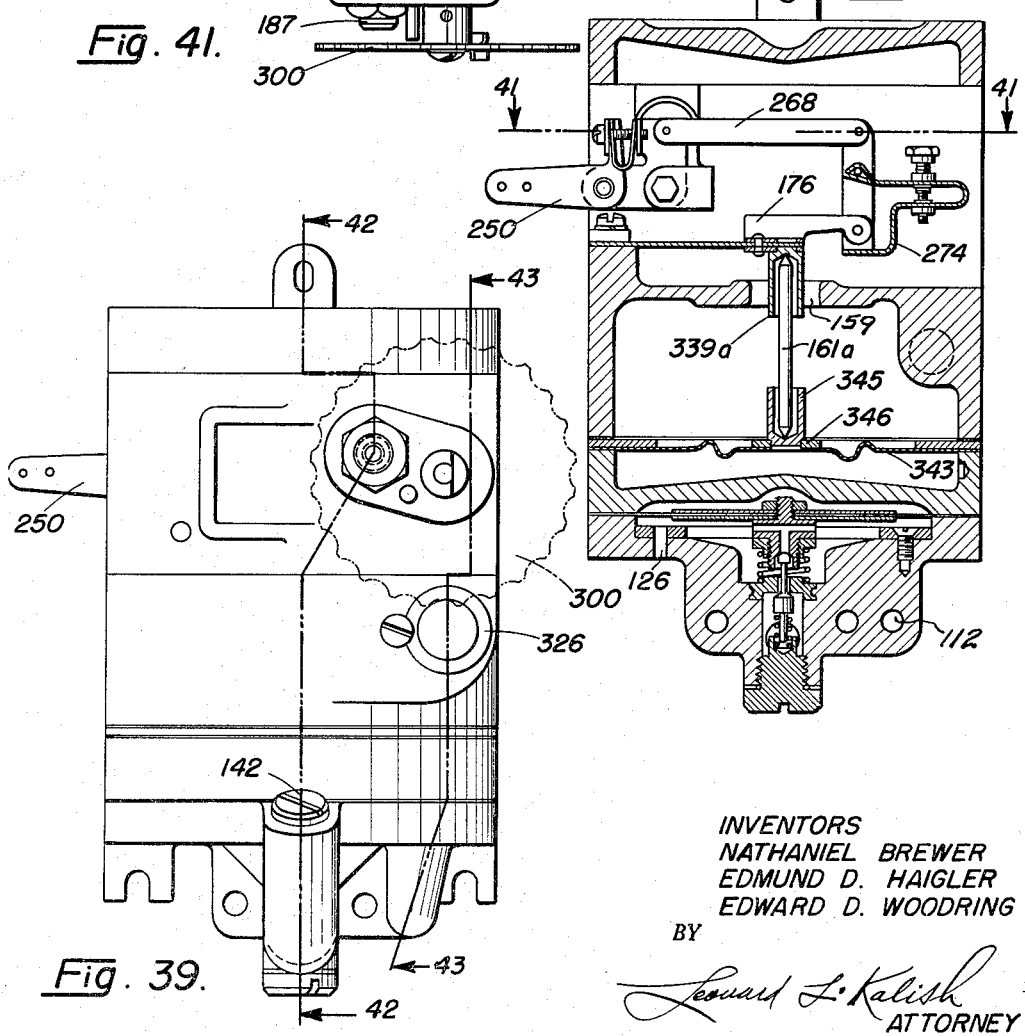
Fig. 40.
Fig. 41.
Fig. 39.
INVENTORS
NATHANIEL BREWER
EDMUND D. HAIGLER
EDWARD D. WOODRING
BY
Leonard L. Kalish
ATTORNEY

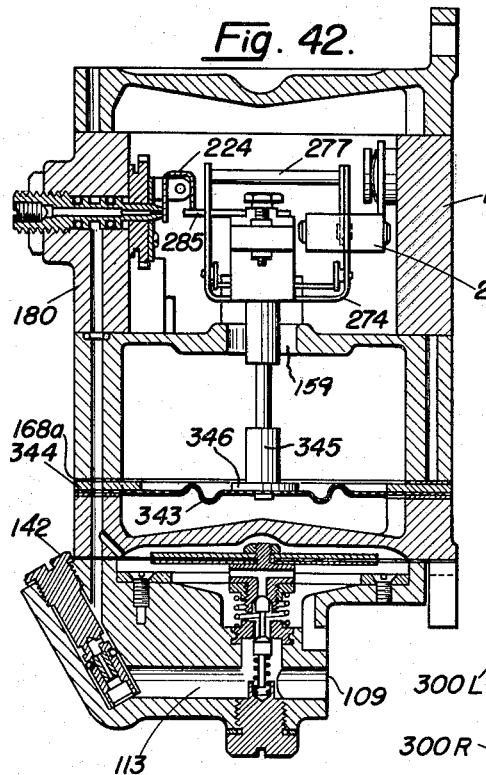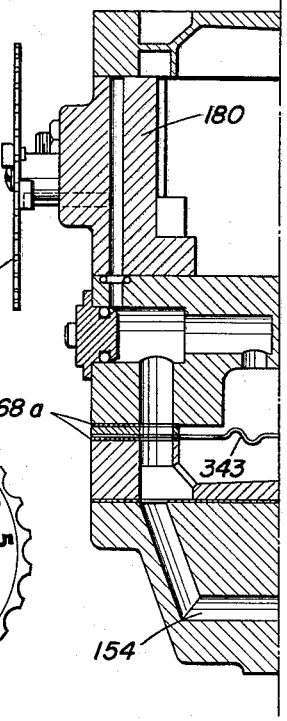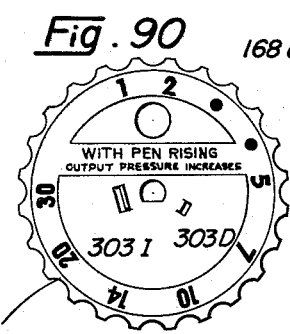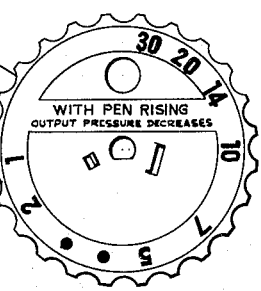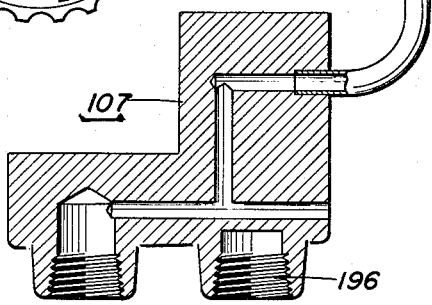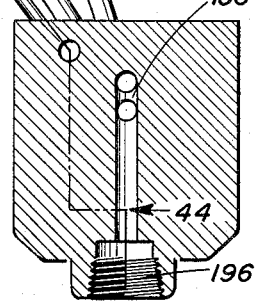

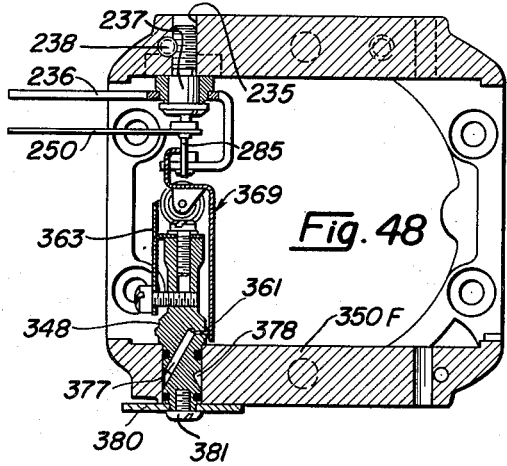
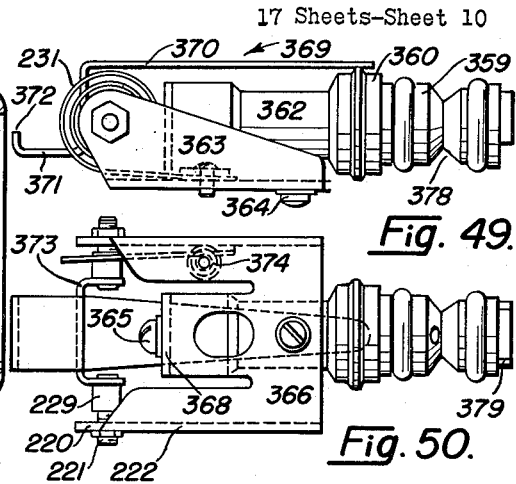
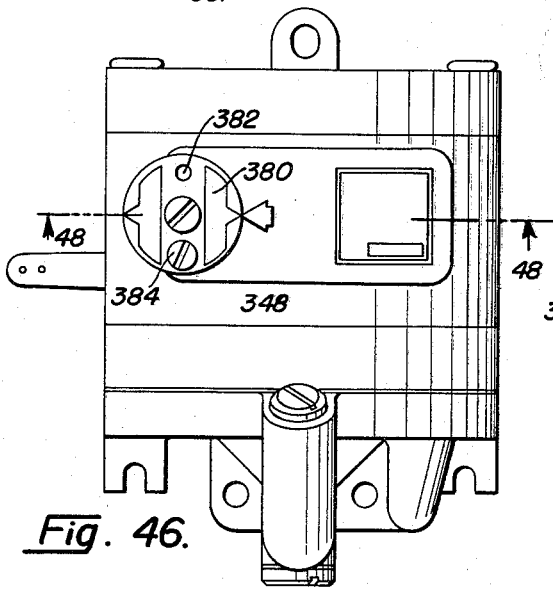
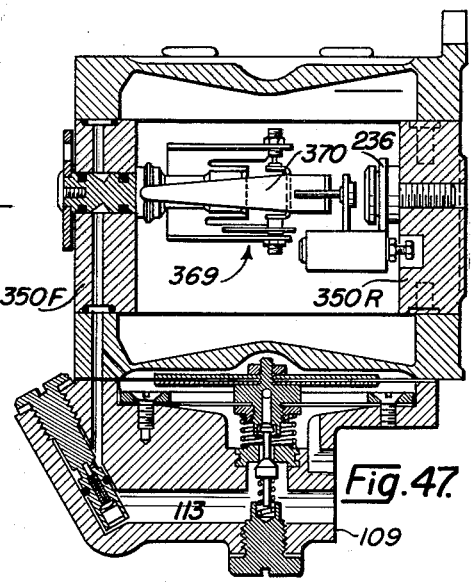
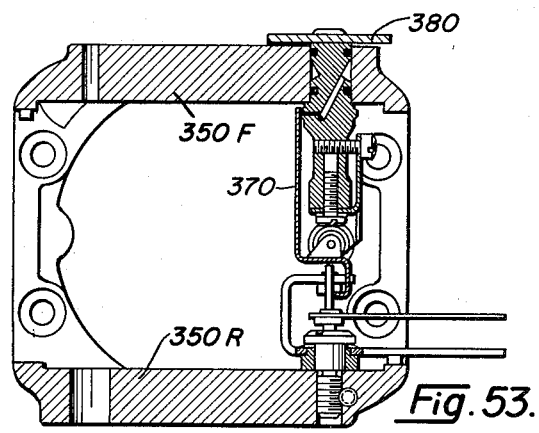
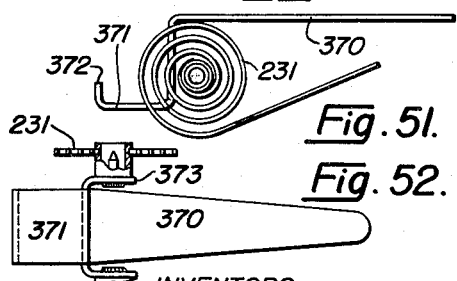

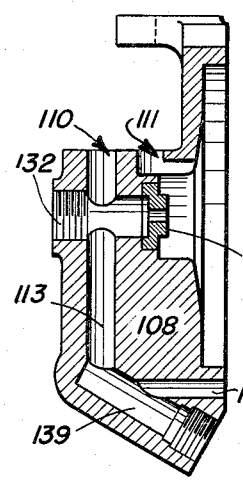
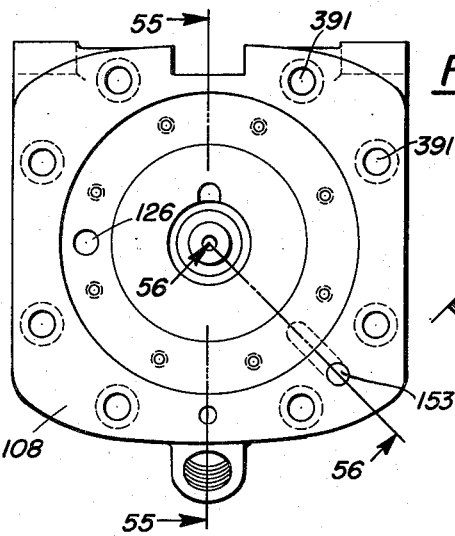
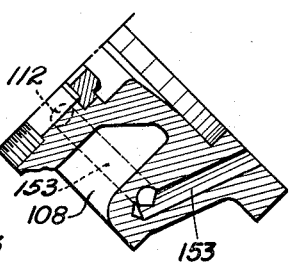
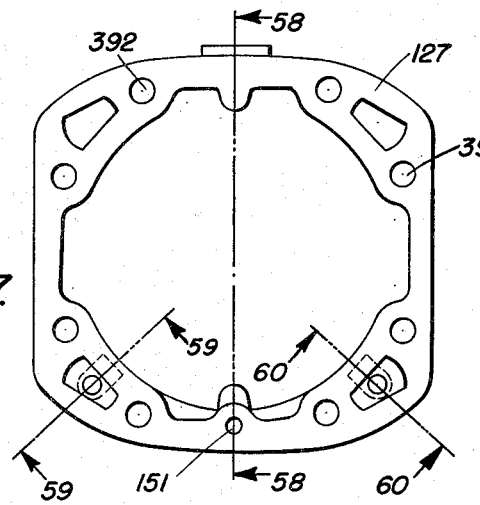
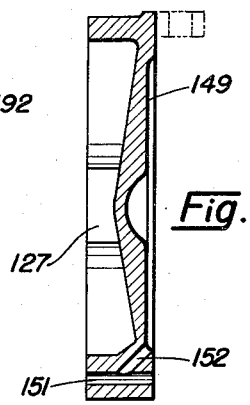
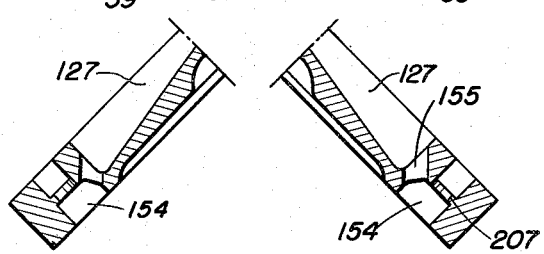

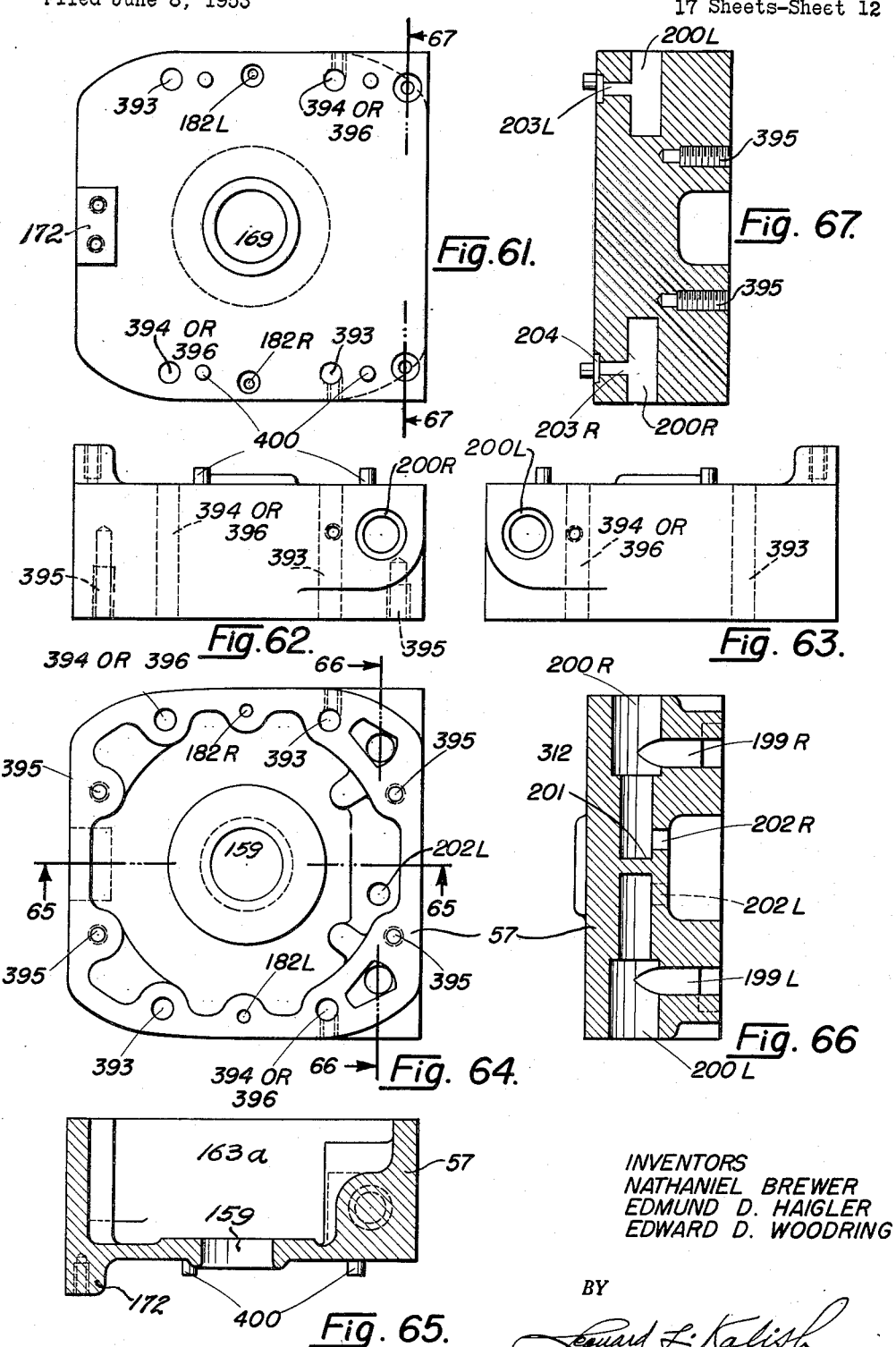

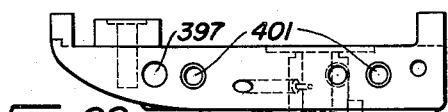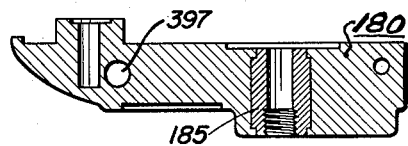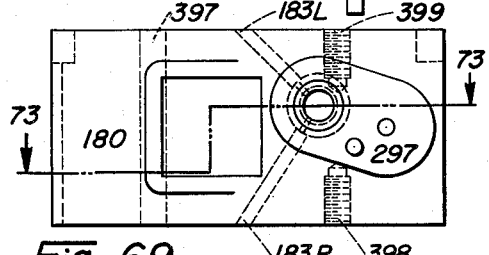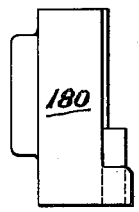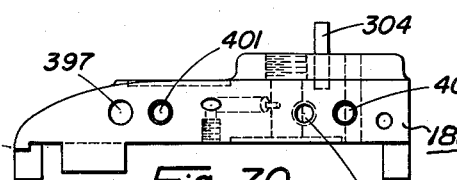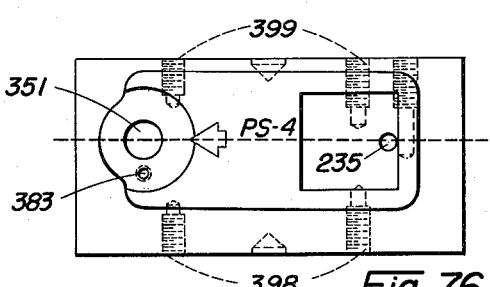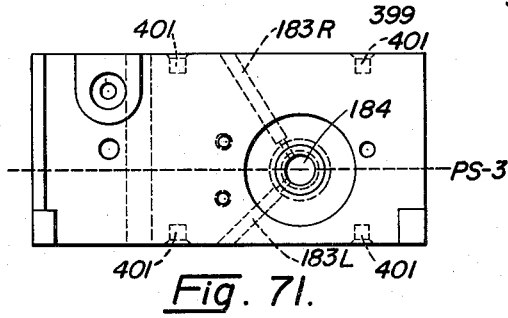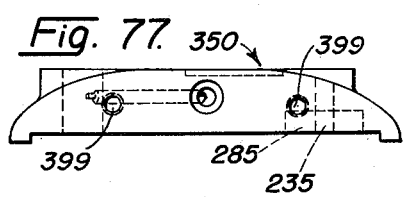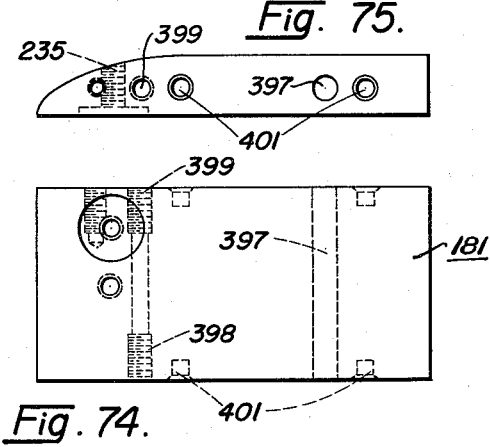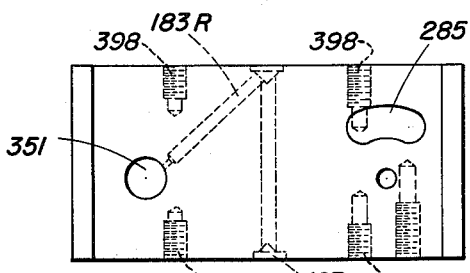

July 23, 1963

N. BREWER ETAL 3,098,498

PNEUMATIC CONTROLLERS

Filed June 8, 1953

INVENTORS
NATHANIEL BREWER
EDMUND D. HAIGLER
EDWARD D. WOODRING

BY

Leonard L. Kalish

ATTORNEY

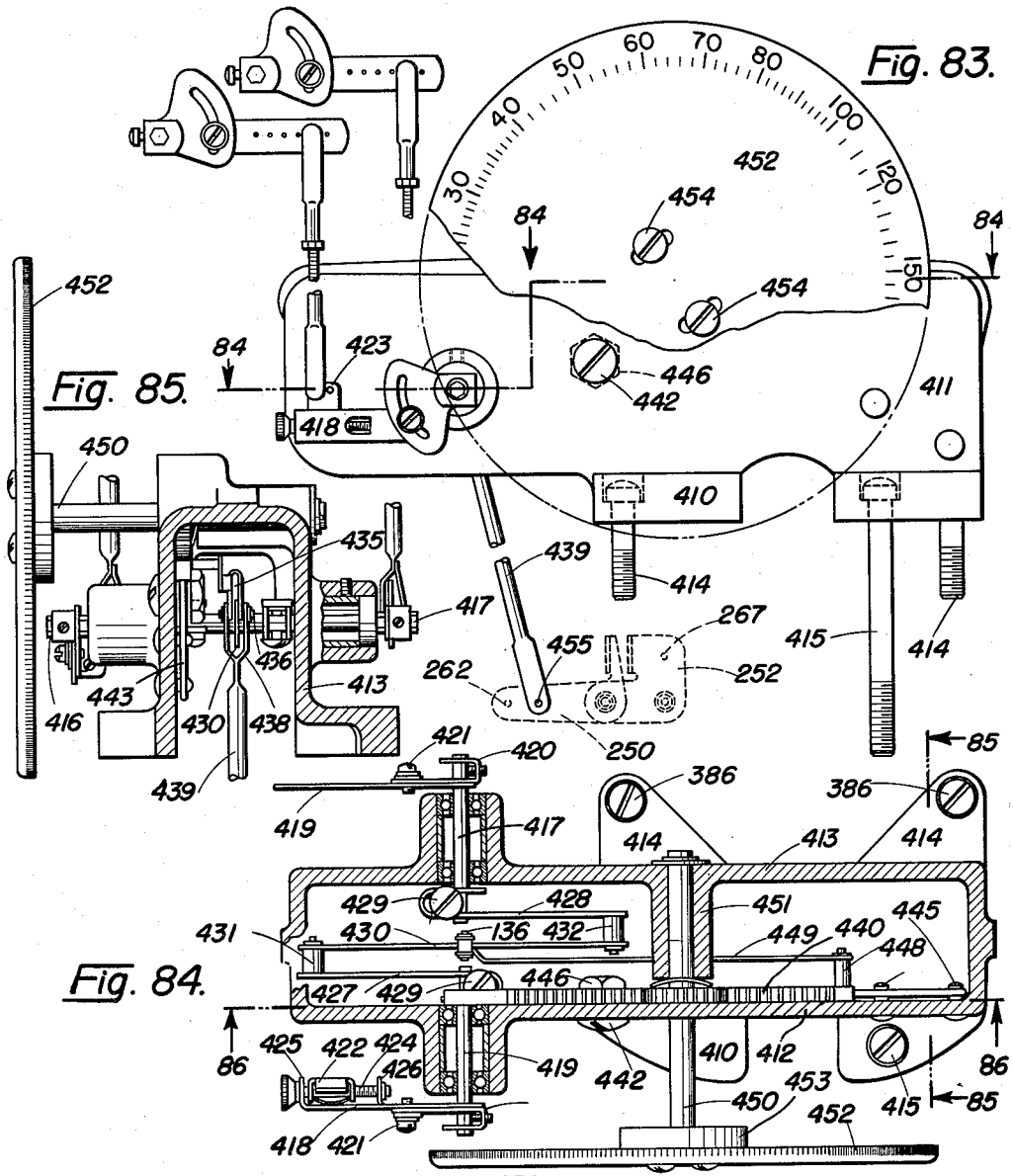
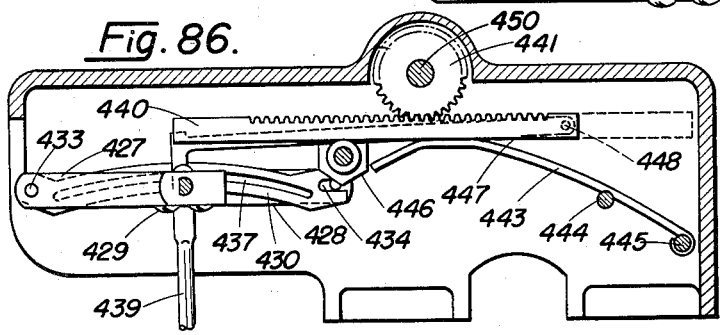

INVENTORS
NATHANIEL BREWER
EDMUND D. HAIGLER
EDWARD D. WOODRING
BY
Leonard L. Kalish
ATTORNEY

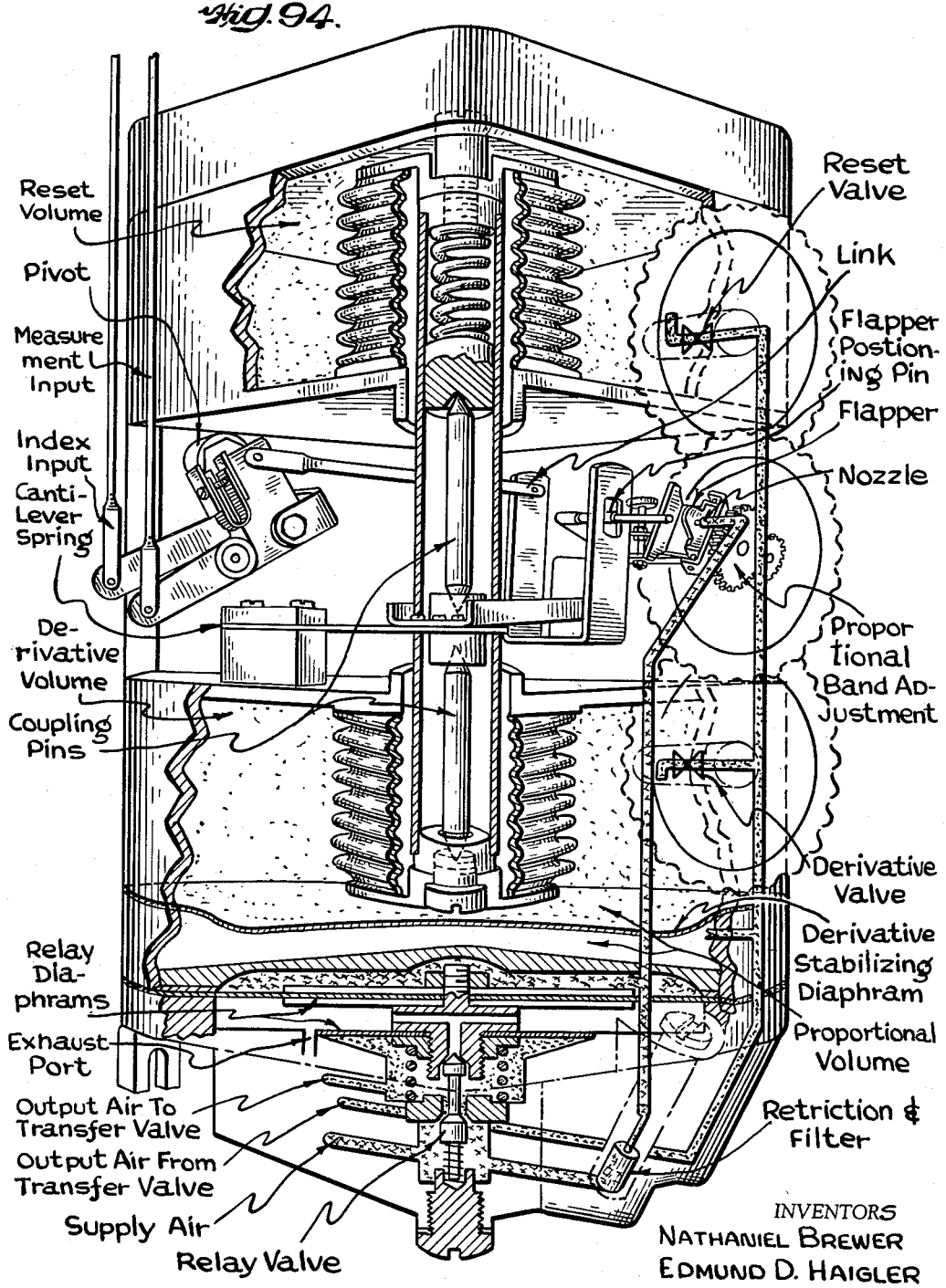

United States Patent Office 3,098,498
Patented July 23, 1963

3,098,498
PNEUMATIC CONTROLLERS
Nathaniel Brewer, Newtown, Edmund D. Haigler, Hatboro, and Edward D. Woodring, Plumsteadville, Pa., assignors to Fischer & Porter Company, Hatboro, Pa., a corporation of Pennsylvania
Filed June 8, 1953, Ser. No. 361,128
26 Claims. (Cl. 137—86)

The present invention relates to controllers and particularly pneumatic controllers adapted to receive an input motion from a measuring element (such as that measuring rate-of-flow, temperature, pressure, humidity, liquid-level, viscosity, or specific gravity, etc.); the output of the controllers being a pneumatic or fluid pressure which is impressed upon a measuring element or upon a setting element in another indicating, recording or controlling instrument or valve-positioning relay or upon a final control element (such as an air-motor-operated valve, damper or the like (whereby the rate-of-flow, temperature, pressure, humidity, liquid-level, specific gravity, or viscosity is then maintained at any desired and selected setting.

Thus, for instance, the input-motion of the controller of the present invention may be obtained from a rate-of-flow meter, such as a variable-area type rate-of-flow meter (sometimes called rotameter) whose measurement or reading is first converted into a mechanical motion external of the metering chamber, by a magnetic coupling such as that (for example) shown in Brewer Patent 2,425,691, or Bowie Patent 2,380,399, connected to one arm of a pivoted lever whose other arm is connected to the input-lever of the present controller or first connected to the pen-arm of a recorder and from it connected to the input-lever of the present controller, or whose measurement is translated into mechanical motion through either a direct electro-magnetic coupling, such as for example, that of Brewer patent application Serial No. 106,171, filed July 22, 1949 (now Patent No. 2,662,223, issued on December 8, 1953), or by means of an intermediate electrical servo motor.

Similarly, viscosity measurements, for example, from a viscosimeter like that shown in Fischer Patent 2,426,393, may be impressed upon a magnetically coupled motion-transmitter or an electro-magnetically coupled motion-transmitter, as above, or a single-float viscosimeter (namely, a variable-area type of metering chamber provided with a single viscosity-sensitive float as shown, for example, in Brewer patent application Serial No. 300,164, filed July 22, 1952) may be inserted in a small by-pass from a pipe-line, in which by-pass the rate-of-flow is maintained constant by means of a flow-regulator-valve whose position is controlled by a viscosity-immune rate-of-flow meter like that (for example) of Fischer Patent 2,350,343 coupled to and acting through a valve-regulator.

The pneumatic output of the controllers of the present invention may be impressed upon a flow-regulating valve or damper, operated by a pneumatic motor, which valve or damper is opened or closed, or whose intermediate position is determined by the pneumatic output of the controllers of the present invention.

By "pneumatic" we intend to include not only air-operated but also gas-operated controllers embodying the present invention.

One of the objects of the present invention is a sectional construction in controllers such that with but comparatively few sections a relatively large repertoire of controllers may be formed and whereby such controllers may be made either right-handed or left-handed. While the need for right-handed or left-handed controllers has special reference to the side upon which the input lever is located, yet as the adjusting dial or dials on the controller are generally on the side opposite to that on which the input lever or levers are located, we refer to a right-handed controller if the dial or dials are on the right-hand side when facing the controller and we refer to it as a left-handed controller if the dial or dials are on the left side.

Another object of the present invention is to achieve accuracy and dependability in the controllers through a rigid stack construction and also to enable the more ready servicing and change of the controller in the field to perform different functions, with a minimum number of parts to achieve all the various functions and combinations of function, and with a minimum of general disassembly for specific service or conversion operations.

One of the characteristics of the controllers of the present invention is that they include sections which are symmetrical both as to their pneumatic passageways as well as to their fastening passageways about certain planes of symmetry and are so arranged that the same housing and pneumatic-passageway-bearing member may perform different functions in the same controller by mere reversal of its position. Thus, for instance, the same section performs the function of a top or closure member as well as the function of a partition member or chamber-performing member in the lower part of the controller. Similarly, the same pneumatic section may be used above and below the input-and-nozzle section for performing two different functions.

In the accompanying drawings, hereinafter referred to, like reference characters indicate like parts.

FIGURE 1 represents a perspective view of a 3-function or proportional-reset-derivative controller embodying the present invention, namely, a controller whose pneumatic output is substantially proportional to (a) the deviation of the measurement from the predetermined setting, and (b) the integral of such measurement-deviations and (c) the first time-derivative of the measurement, namely, the time-rate of change-of-deviation.

FIGURE 7 represents a front elevational view of the 3-function controller shown in FIGURE 1.

FIGURE 8 represents a vertical cross-sectional view, taken through the center, of the controller shown in FIGURE 1, in a plane parallel to the plane of FIGURE 7, and taken generally on line 8—8 of FIGURE 9.

FIGURE 9 represents a horizontal sectional view taken on line 9—9 of FIGURE 8.

FIGURE 10 represents a vertical sectional view taken on line 10—10 of FIGURE 7.

FIGURE 10-a is a fragmentary cross-sectional view, on an enlarged scale, of the filter and constrictor-carrying plug shown at the bottom, left, in FIGURE 10.

FIGURE 10–b represents a fragmentary cross sectional view, on an enlarged scale, of the inlet and vent valves (of the relay) as shown at the bottom, center, in FIGURE 10.

FIGURE 11 represents a fragmentary vertical cross-sectional view taken on line line 11—11—11—11 of FIGURE 7 (but showing only the left half of such cross-section); showing, among other things, the feed-back passage from the relay and the derivative needle-valve in said passage, and showing the reset passage and the reset needle-valve in said passage, but omitting the bellows and nozzle parts.

FIGURE 12 represents a rear elevational view of the lower or relay section of the controller; showing the supply, output and feed-back air-passageways which register with corresponding passageways in the meeting or juncture face of the air-interconnector shown in FIGURES 13, 44 and 45 (and also showing the two screw-holes to receive the screws by which it is affixed, with gasket interposed, to the relay-section).

FIGURE 13 represents a side elevation of the air-interconnector which co-acts with the relay-section of the controller (FIGURE 10) shown immediately adjacent to it and in operative alignment with it (cross-sections of this air-interconnector being shown in FIGURES 44 and 45).

Figure 1:
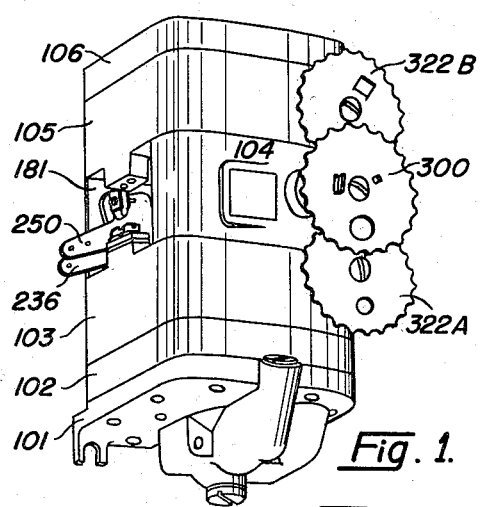
Figure 2:
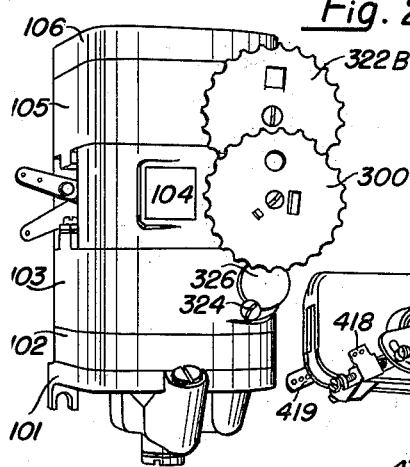
FIGURE 2 represents a perspective view of a 2-function or proportional-reset controller embodying the present invention, namely, one whose pneumatic output is substantially proportional to (a) the deviation of measurement from the predetermined setting and (b) the integral of the measurement-deviations.

FIGURE 14 represents a vertical cross-sectional view of the 2-function controller shown in FIGURE 2, taken in the same plane as that in which FIGURE 11 is taken (but with a plug replacing the derivative valve of the controller shown in FIGURES 1, 7–10 and 11); this 2-function controller being of the same construction as the 3-function controller shown in FIGURES 1, 7–13, except for the difference shown in this FIGURE 14.

FIGURE 15 represents a rear elevation of the nozzle-section 104 of the controller, showing the rotatable flapper mounted thereon this form of construction of nozzle-section 104 being common to all the controllers shown herein, excepting the on and off controller shown in FIGURES 5 and 46 to 53, inclusive.

FIGURE 16 represents a section on line 16—16 of FIGURE 15, showing the flapper-rotating shaft, gear and dial, journaled in the nozzle-section 104.

FIGURE 17 represents a section on line 17—17 of FIGURE 15; on an enlarged scale (four times full size), showing the pilot or detector valve, including the stationary nozzle 187 and 193 and the tiltable flapper or baffle 225.

FIGURE 18 represents a section on line 18—18 of FIGURE 15 (on the same scale as FIGURE 17), showing said pilot or detector valve.

FIGURE 19 represents a front elevation of the setting input lever, on a scale approximately twice actual size.

FIGURE 20 represents a top plan view of the same.

FIGURE 21 represents a side elevation of the same.

FIGURE 22 represents a front elevation of the measurement input lever, on the same scale as FIGURES 19–21.

FIGURE 23 represents a top plan view of the same.

FIGURE 24 represents a front elevation of the flapper-deflecting frame.

FIGURE 25 represents a top plan view of the same.

FIGURE 26 represents a side elevation of the same.

FIGURE 27 represents a front elevation of the flexure spring member.

FIGURE 28 represents a top plan view of the same.

FIGURE 29 shows the differential-adjustment screw 287 shown in FIGURES 24 and 25, but here shown on an enlarged scale.

FIGURE 30 represents an axial cross-section of the derivative and reset needle valves, on a scale approximately twice the actual size.

Figure 3:
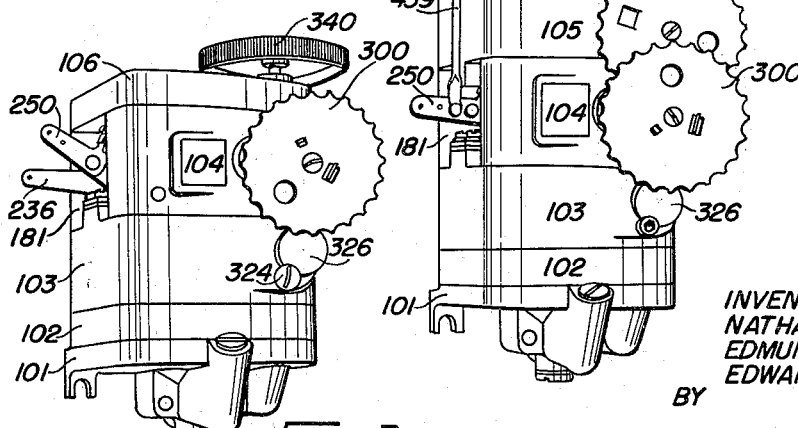
FIGURE 3 represents a perspective view of a wide-band proportional controller embodying the present invention.

FIGURE 31 represents a front elevation of the wide-band proportional controller shown in FIGURE 3.

FIGURE 32 is a vertical center-line section of the controller as shown in FIGURE 31, taken in a plane parallel to the plane of FIGURE 31, on line 32—32 of FIGURE 33.

FIGURE 33 represents a horizontal section on line 33—33 of FIGURE 32.

FIGURE 34 represents a vertical section on line 34—34 of FIGURE 31.

FIGURE 35 represents a fragmentary vertical cross-sectional view, on line 35—35 of FIGURE 31, of the left half of such section (omitting also the nozzle and flapper mechanism).

FIGURE 36 represents a top plan view of the controller shown in FIGURES 31 to 35, inclusive.

FIGURE 37 represents a vertical section on diagonal line 37—37 of FIGURE 36, of the cover section of the controller as shown in FIGURES 31 and 32 to 35.

FIGURE 38 represents a fragmentary cross-sectional view similar to that shown in FIGURE 35, of the left half of such section, showing a variant form of construction in which a set-screw 341 and a lock-nut 342 are used instead of the dial-knob (340 and 337 in FIGURES 3, 31, 35 and 36), for manual reset, and with derivative valve (shown in FIGURE 30) added, to form a proportional derivative action controller.

Figure 4:
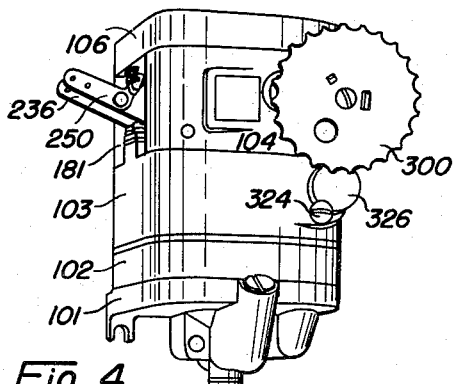
FIGURE 4 represents a perspective view of a narrow-band proportional controller embodying the present invention.

FIGURE 39 represents a front elevation of the controller shown in FIGURE 4.

FIGURE 40 represents a center section of the controller shown in FIGURES 4 and 39, taken generally on line 40—40 of FIGURE 41.

FIGURE 41 represents a horizontal section taken generally on line 41—41 of FIGURE 40.

FIGURE 42 represents a vertical section on line 42—42 of FIGURE 39.

FIGURE 43 represents a fragmentary vertical cross-sectional view on line 43—43—43—43 of FIGURE 39, without bellows or nozzle mechanism; showing the left-hand of such cross-section.

FIGURE 44 represents a section on line 44—44—44—44 of FIGURE 45.

FIGURE 45 represents a section on line 45—45 of FIGURE 13.

Figure 5:
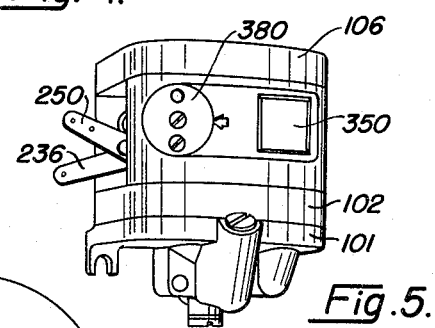
FIGURE 5 represents a perspective view of an on-and-off controller embodying the present invention.

FIGURE 46 represents a front elevation of the on-and-off controller shown in FIGURE 5.

FIGURE 47 represents a vertical section of the controller shown in FIGURE 46.

FIGURE 48 is a horizontal section on line 48—48 of FIGURE 46.

FIGURE 49 is a top plan view of the nozzle and flapper system of the above controller.

FIGURE 50 is an elevation of the same.

FIGURE 51 is a top plan view of the flapper assembly.

FIGURE 52 is an elevation of the same.

FIGURE 53 represents a horizontal section similar to that shown in FIGURE 48, but showing a reversal of the two housing-blocks which make up this nozzle-and-flapper and lever section, whereby the controller may be converted from a right-hand controller as in FIGURES 46, 47 and 48, to a left-hand controller as indicated in FIGURE 53.

FIGURE 54 represents a top plan view of the housing or body portion 108 of the relay section 101 shown in FIGURES 1 to 8, 10 to 12, 14, 31, 32, 34, 35, 38, 39, 40, 42, 43, 46, 47, 81, 87 and 88.

FIGURE 55 represents a vertical section on line 55—55 of FIGURE 54.

FIGURE 56 represents a fragmentary vertical cross-sectional view taken on diagonal line 56—56 of FIGURE 54; showing the half of said section through which line 56—56 is extended.

FIGURE 57 represents a top plan view of the partition and cover section 102 shown inter alia, in FIGURES 1 to 7.

FIGURE 58 represents a section on line 58—58 of FIGURE 57.

FIGURE 59 represents a section on line 59—59 of FIGURE 57.

FIGURE 60 represents a section on line 60—60 of FIGURE 57.

FIGURE 61 represents a top plan view of the bellows section of the proportional controllers (as, for example, bellows section 103 in FIGURES 1 to 5 and 7, and bellows section 105 in FIGURES 1, 2, 6 and 7).

FIGURE 62 represents a front elevation of the same.

FIGURE 63 represents a rear elevation of the same.

FIGURE 64 represents a bottom plan view of the same.

FIGURE 65 represents a section on line 65—65 of FIGURE 64.

FIGURE 66 represents a section on line 66—66 of FIGURE 64.

FIGURE 67 represents a section on line 67—67 of FIGURE 61.

FIGURE 68 is a top plan view of the nozzle and flapper section 104 of the proportional controllers shown, inter alia, in FIGURES 1–4, 6, 7, 9, 10, 14, 15, 18, 31, 33, 34, 39, 41, 42, 87 and 89.

FIGURE 69 is a front elevation of the same.

FIGURE 70 is a bottom view of the same.

FIGURE 71 is a rear elevation of the same.

FIGURE 72 is a side elevation of the same.

FIGURE 73 is a horizontal section on line 73—73 of FIGURE 69.

FIGURE 74 represents a front elevation of the rear or mechanical input section of the proportional controllers shown, inter alia, in FIGURES 1–4, 6, 8, 9, 32, 33, 40, 41, 81, 88 and 89.

FIGURE 75 represents a top plan view of the same.

FIGURE 76 represents a front elevation view of the nozzle and flapper section and of the mechanical input section of the on-and-off controller shown in FIGURES 5, 46, 47, 48 and 53, the same section being used both for the nozzle and flapper at the front of the controller as well as for the mechanical input at the back of the on-and-off controller.

FIGURE 77 represents a bottom plan view of the same.

FIGURE 78 represents a rear elevation of the same.

Figure 79:
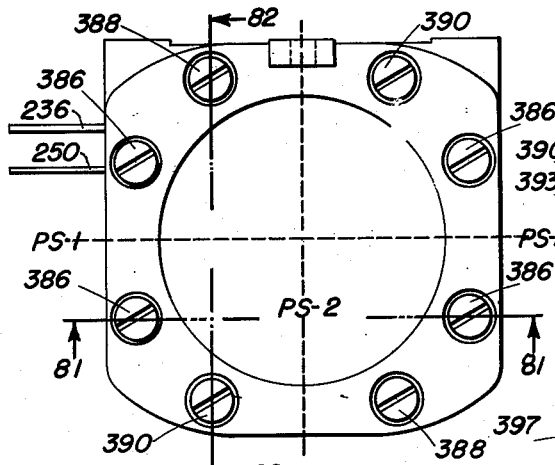

FIGURE 79 represents a top plan view of the controller shown in FIGURES 1, 7 and 8.

Figure 80:
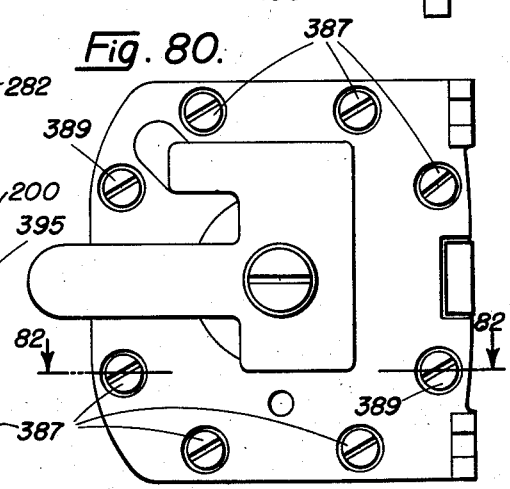

FIGURE 80 represents a bottom plan view (looking upward) of the controller last mentioned shown particularly in FIGURE 10.

Figure 81:
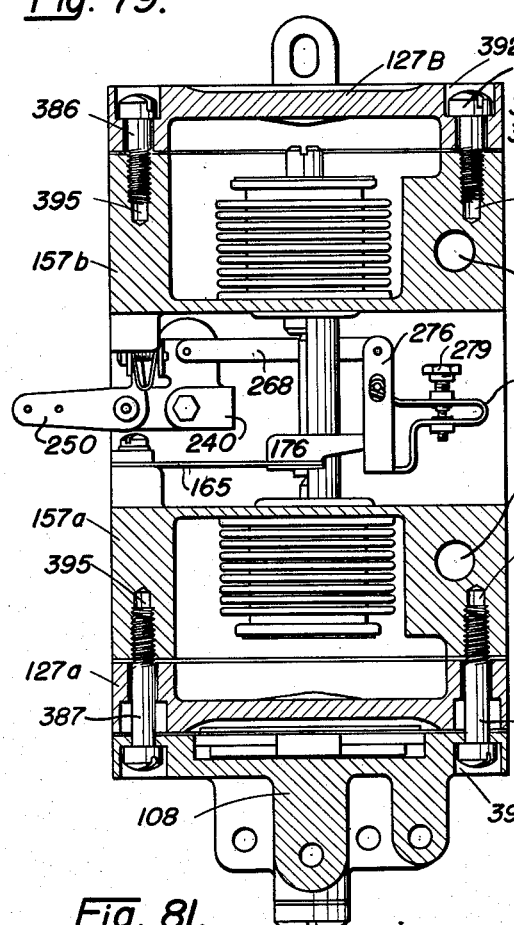

FIGURE 81 represents a vertical section on line 81—81 of FIGURE 79.

Figure 82:
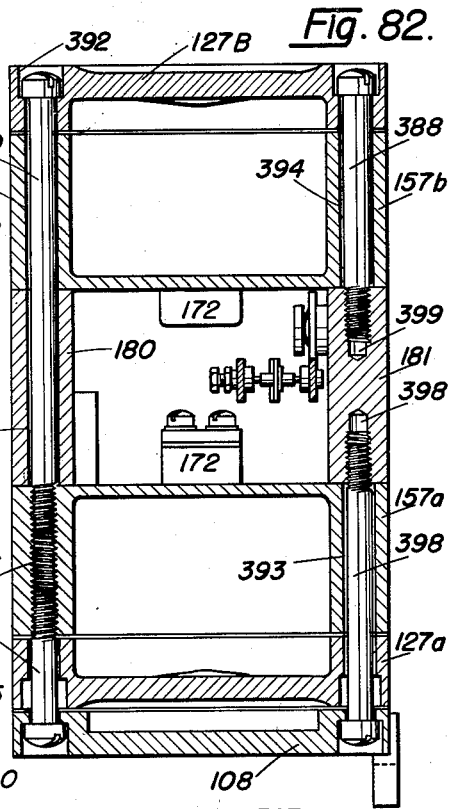

FIGURE 82 represents a vertical section on line 82—82 of FIGURE 79.

Figure 6:
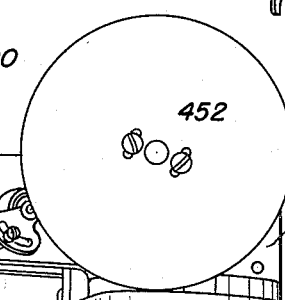
FIGURE 6 represents a perspective view of a 2-function controller like that of FIGURE 2, with an adjustable ratio input mechanism like that of Brewer Patent 2,481,-496, adapted to receive two input-motions and to transfer a single input-motion to the controller in proportion to the deviation from a set ratio of the first two input-motions.

FIGURE 83 represents a front elevation of the ratio input mechanism shown at the top of the controller of FIGURE 6.

FIGURE 84 represents a horizontal section on line 84—84—84 of FIGURE 83.

FIGURE 85 represents a vertical section on line 85—85 of FIGURE 84.

FIGURE 86 represents a vertical section on line 86—86 of FIGURE 84.

Figure 87:
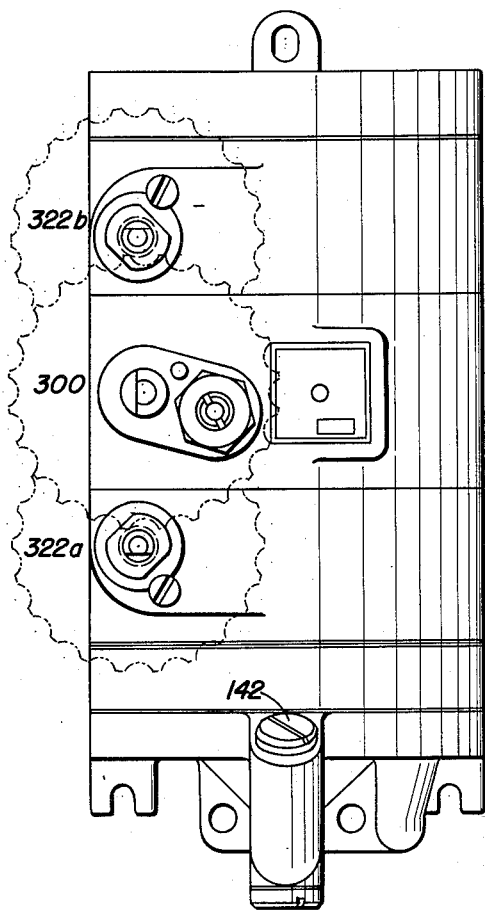
Figure 88:
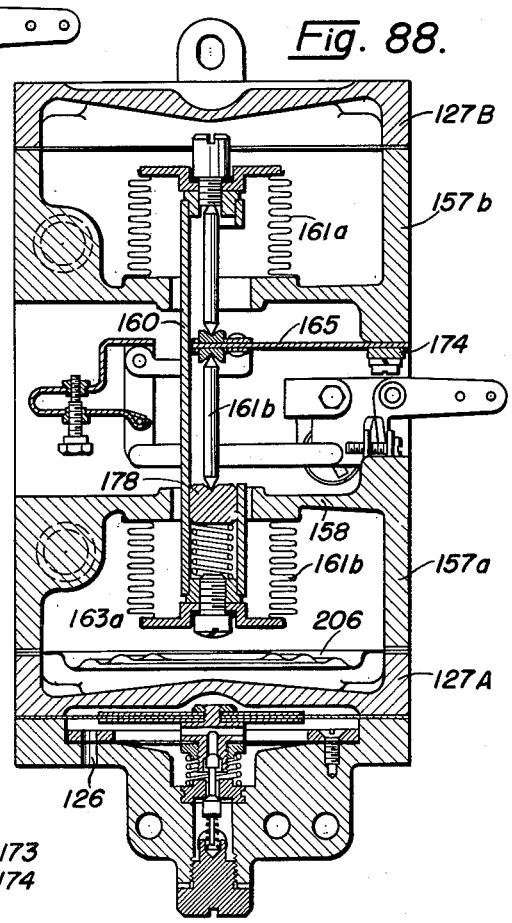
Figure 89:
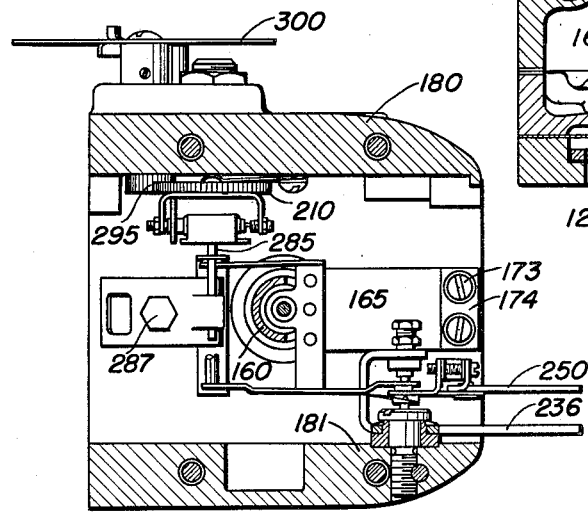

FIGURES 87, 88 and 89, are similar to FIGURES 7, 8 and 9, respectively, and show the same controller, excepting only that whereas the controller shown in FIGURES 7, 8 and 9 (and also shown in FIGURE 1) is a right-hand controller, that shown in FIGURES 87, 88 and 89 is the left-hand counterpart thereof; showing the manner in which the interchangeability of components permits the conversion of the controller from a left-hand controller to a right-hand controller, without the addition or subtraction of any part.

FIGURES 90 and 91 represent elevational views of left-hand and right-hand dials, respectively, illustrating the construction and arrangement of the dials of the controllers of the present invention; the dials so illustrated being for the narrow-band proportional controllers.

FIGURES 92 and 93 represent elevational views of the left-hand and right-hand dials, respectively, illustrating the construction and arrangement of the dials of the controllers of the present invention; the dials so illustrated in these figures being for the wide-band proportional controllers.

FIGURE 94 is a diagrammatic or schematic perspective view of the controller shown in FIGURES 1, 7 to 13, 15 to 30, 54 to 78 and 90 to 93.

The controllers of the foregoing drawings and hereinafter more fully described, are so constructed as to make the elements thereof interchangeable and separable, whereby the same elements may be used to form the minimum-function controller, as, for instance, that shown in FIGURES 5 and 46 to 48, inclusive, as well as to form the maximum-function controller, as for instance, that shown in FIGURES 1, 7 and 11, or to form any multiple-function controller such as those shown in the other drawings and hereinafter more fully described.

Thus, the controllers of the present invention are characterized, inter alia, by a sectional construction, with air-passageways formed in the successive sections, in registration with each other and with the cooperative elements of each section in operative alignment with each other, when the sections are operatively juxtaposed to each other.

The following is an outline of the principal "sections" of the controllers of the present invention. The word "sections" as used in this description has reference to the successive main components into which the controllers are divisible and out of which they are formed (as distinguished from use of the word "section" to denote a cross-sectional or sectional view or "section" as viewed in reference to drawings or graphic illustrations).

Referring to FIGURES 1 and 7 to 11, inclusive the controllers shown in these figures include the relay section designated generally by the numeral 101, the partition section 102, the proportional-bellows section 103, the input-and-nozzle section 104, the reset-bellows section 105 and the cover section 106.

The input-and-nozzle section 104 may also be regarded as the input-and-detector section, wherein the nozzle-member 187, the flapper-plate 225, and the flapper-deflecting means (together with their associated elements such as the detector-housing member 180, etc.) constitute the "detector" or the detector-section which forms a part of the input-and-detector section, and wherein the input-housing member 181 and the pivot, the levers and linkages carried thereby (FIGURE 9) constitute the "input" or the input section, which also forms a part of the input-and-detector or input-and-nozzle section 104.

The air-interconnector 107, as shown in FIGURE 13, is, in turn, connected to the air-ported face 109 (FIGURE 12) of the relay section 101, to form an interconnected passageway to connect the output passageway with the feed-back passageway, and to form and provide air-supply and air-output passageways communicating with these passageways in the relay.

The relay section 101 (FIGURES 1, 7, 8, 10, 11 and 10–b), which forms a part of each of the controllers hereinabove referred to, includes a housing or main body member 108, in whose ported face 109 the air-supply port 110 and the output port 111 and the feed-back port 112 are formed. The air-supply port 110 is the terminus, in the relay body 108, of the supply passageway 113. A valve-passageway 114 is extended within the body 108 transversely of the supply passageway 113, which communicates with the output pressure chamber 115 through the inlet-valve-seat member 116 which is stationarily mounted or cast in situ in the body 108. The inlet-valve-seat member 116 is provided with an aperture extending therethrough, the outer periphery of which serves as a stationary valve-seat. A flexible diaphragm 117 is mounted within the relay body 108 to form a closure-wall of the output pressure chamber 115; being mounted therein and held in pneumatically-sealed relation to the body 108 by a clamping ring 118 secured to the body by screws 119, at spaced intervals around the ring.

The diaphragm 117 (FIGURE 10–b) has a central aperture in which the movable vent-valve body 120 is mounted and secured in pneumatically sealed relation to the diaphragm by the clamping ring 121 around the tubular of the movable vent-valve body 120; the locking sealing ring 121 being screw-threaded onto the tubular stem of the valve body 120.

The movable vent body 120 includes an axial aperture 122, the lower outer periphery of which serves as a valve-seat, and communicates with one or more lateral vent-openings 123, which open out or discharge on the vent-side of the diaphragm 117, namely, in the space 124 between the diaphragm 117 and the nozzle-diaphragm 125.

The space 124, between the output-pressure diaphragm 117 and the nozzle-pressure diaphragm 125, is, in turn, vented to the atmosphere, through one or more vent openings or 126 (shown in FIGURES 8, 32, 40 and 88).

The outer periphery of the nozzle-pressure diaphragm 125 is clamped between and pneumatically sealed in relation to the relay body 119 and the body 127 of the partition section 102.

The diaphragm 125 (FIGURE 10–b) may be flanked by a pair of similar stiffening discs 128 and 129. The diaphragm 125 and its discs 128 and 129 are provided with a registering central aperture, through which a screw-extension 130 of the movable valve housing 120 is extended, and the diaphragm 125 and its discs are firmly held to the movable valve body 120, in pneumatically sealed relation thereto, by nut 131.

The movable escape-valve or venting valve body 120 (FIGURE 10–b) being connected to both the output-pressure diaphragm 117 and to the nozzle-pressure diaphragm 125, will at all times assume a position which is the resultant of the forces by the respective air pressures on the exposed areas of the diaphragms and of the biasing springs. The nozzle-pressure diaphragm 125 is of substantially larger diameter than the output-pressure diaphragm 117; the respective diameters being the outermost diameters of the free or movable portions of the diaphragms. These respective diameters of the diaphragms are such that the affected area of the nozzle-pressure diaphragm 125 will be approximately four times the affected area of the output-pressure diaphragm 117. The ratio of four-to-one may of course be changed, although in the specific embodiment shown this ratio has been selected as one ratio which has been found quite satisfactory and desirable for practical operating condition.

A screw-threaded opening 132 (FIGURES 10 and 10–b) is provided in the relay body 108, opening into the supply-passage 113, and into this opening a valve-stem-guiding screw-plug 133 is screw-threadedly secured (with a suitable gasket beneath the head thereof for pneumatically sealing the plug in the opening). The plug 133 is provided with an inner cup-like terminal portion 134 in which the lower end of a helical compression spring 135 is nested, and the bottom of which cup serves as an abutment for the lower end of the spring. The valve-seat-end of the movable vent-valve body 120 is provided with an enlarged cup-like opening just beneath the movable valve-seat, which serves to guide the vent-valve-head 136. The single valve-stem 137 extends through the helical compression spring 135, partly into the guiding cup 134 and extends through the central passageway in the inlet-valve-seat member 116 and carries the vent-valve-head 136 at its upper end and carries the inlet-valve-head 138 intermediate its ends. The two valve heads 136 and 138 and the lower end of the valve-stem 137 are so spaced in relation to each other that when the movable vent-valve body 120 is deflected downwardly by the resultant of the opposed air and spring forces, the vent-valve-head 136 is seated upon its valve-seat at the lower end of the aperture 122 and closes it while the inlet-valve-head 138 is at the same time unseated from its valve-seat in the member 116, and so that when the vent-valve-body 120 is deflected upwardly by the resultant of the air and spring forces, the inlet valve 138 first shuts off the inlet-air, and then the vent valve 136 unseats; the lower end of the valve-pipe stem 137 being nested and guided within the helical compression spring 135 and having its lower end spaced sufficiently off the bottom the cup 134 to permit a sufficient unseating movement of the valve 138.

The plug 133 also serves to provide access for the insertion and removal of the valve-stem 137 with its valve-heads 136 and 138 and the spring 135 which urges them upwardly.

The supply passage 113 (FIGURE 10–a) communicates with restrictor passageway or chamber 139, in which an air-filter 140 is mounted, and above it, a capillary restrictor tube 141 is mounted, and so arranged that the flow of air from the supply passage 113 is restricted to flowing through this capillary tube 141.

In the embodiment shown (FIGURE 10–a), a removable plug 142 is mounted within the chamber 139 with its outer end screw-threaded in the chamber 139 and sealed pneumatically by a gasket beneath the head thereof. The plug 142 is provided at its lower end with a tubular portion including a smaller diametered bore in which the capillary tube 141 is mounted (and cemented or otherwise sealed in place) and a larger diametered lower bore in which the air-filter or screen 140 is mounted. This filter may be glass wool or the like. An aperture or passageway 143 extends from the bore in which the capillary tube 141 is mounted, to a radial aperture 144 which opens into an annular groove 145, for the free egress of air into the registering nozzle-supply passageway 146 in the relay body 108. A ring-receiving groove 147 is also provided around the plug 142, beneath the air-groove 145, and within it, an O-ring 148 is mounted, to seal the plug, pneumatically, in relation to the side-wall of the chamber 139.

The body 127 of the partition section 102 includes a transverse partition wall 149 (FIGURES 8 and 10) which serves as the wall of the nozzle-pressure chamber 150 above the nozzle-pressure diaphragm 125. A nozzle-supply passageway 151 (FIGURE 10) is formed through the body 127 of the partition section, in alignment and registration with the nozzle-supply passageway 146 in the relay body 108 and communicating therewith. A transverse nozzle-pressure passageway 152 extends from the passageway 151 into the nozzle-pressure chamber 150 above the diaphragm 125, so as to impress the nozzle-pressure at all times upon the upper side of the diaphragm 125.

A feed-back passageway 153 is provided in the relay-body 108, as shown particularly in FIGURES 14, 56 and 54 and also shown partially in FIGURES 11, 35, 38 and 43. The outer end of the feed-back passageway 153 terminates in the output feed-back port 112, shown in FIGURES 8, 12, 14, 32, 40 and 88 and also indicated in dotted lines in FIGURE 56.

The partition member 127 is, in turn, provided with another chamber or passageway 154 extending upwardly, and in communication with the feed-back passageway 153 in the relay-body 108. In the embodiment shown in FIGURES 11, 14, 35, 38 and 43 a further passageway 155 is provided transversely of the passageway 154 which communicates with the interior of the body 127, so as to apply the feed-back pressure within the interior of the body 127.

The feed-back passage 153 is in turn connected to the output-pressure side of the diaphragm 117, by the interconnecting passageway 156 in the interconnector 107, which passageway 156 interconnects the output-port 111 with a feed-back port 112, as shown in FIGURE 45.

The diaphragms 117 and 125 (FIGURES 10 and 10–b) are, in the present embodiment, non-metallic diaphragms, preferably a neoprene-coated woven nylon fabric, but may be made of any suitable diaphragm material. The diaphragm 125 also serves as a sealing gasket between the relay body 108 and the partition member 127; the diaphragm 125 having holes through it corresponding to and in registration with the passageways 146 and 151 and also the passageways 153 and 154 (and also having holes therethrough to accommodate the vertical retainer-screws as shown in FIGURES 79 to 82 inclusive; all these holes being however within the peripheral area of the diaphragm material which is clamped and which is immobilized and serves merely as a retaining rim, for the movable or deflectible or active portion of the diaphragm and which also serves as the sealing-gasket between the relay-body and the adjacent partition-section 127.

The proportional-bellows section 103, (FIGURES 1, 7, 8, 10 and 11) includes a housing 157 having side walls and an end wall 158, the latter having a large central aperture 159 (see FIGURE 8) through which the bellows-coupling tube 160 and the flexure-spring driving-pin 161 extends (FIGURES 8–10).

A metallic bellows 162 is mounted within the chamber 163a of the housing 157, with the last convolution of one end thereof cemented to the thickened peripheral portion surrounding the hole 159 (by suitable metal-bonding cement). The other end of the bellows receives a perforated closure disc 164, which is cemented or soldered thereto.

The coupling-tube 160 (FIGURES 8–10) is cut away, to half its diameter (so as to form a half-tube), intermediate its ends, thereby to provide access for the insertion and removal for the coupling-pins and also to permit the entrance of the flexure-spring 165 into the center of the coupling-tube.

A pair of similar tube-end collars 166a and 166b (FIGURE 8), provided with a reduced-diametered portion which is telescoped into the ends of the tube and permanently fastened therein, as for instance by soldering or the like. The holes through the collars 166a and 166b are screw-threaded.

The reset section 105 (FIGURES 1, 8, 10 and 11) is formed again of a bellows housing 157, but inverted in relation to the proportional section 103.

The closure section 106 (FIGURES 1, 8, 10 and 11) is, in turn, formed of another member 127 which forms the partition section 102, but is inverted as shown in FIGURES 8, 10 and 11. A sealing gasket ring 168b intervenes the sections 105 and 106, thereby forming the upper pneumatic chamber 163b. Within the pneumatic chamber 163b the reset bellows 162b is mounted in the same manner as the proportional bellows 162a and having a similar closure disc 164b.

A headed screw 170, having a conical recess in its free end, is extended through the closure disc 164a, with a sealing gasket beneath its head hermetically to seal it to the disc 164a, and is screw-threaded into the tube-closure-member 166a, thereby fastening the movable end of the bellows to the coupling-tube 160 and provide a bearing-cavity for one end of the coupling-pin 161a.

A similar headed screw 171, with a sealing-washer beneath its head, is extended through the bellows-closure disc 164b and screw-threaded into the tube-closure 166b, to fasten the bellows-closure disc 164b firmly to the coupling-tube 160 (FIGURE 8). The head of the screw 171 is extended to serve as a motion-limiting stop, by abutment against the inner surface of the transverse wall or partition wall 149b, thereby to limit the upward displacement of the coupling-tube 160.

The flexure-spring 165 (FIGURE 8) is secured, cantilever fashion, upon the lug 172 extending from the bellows-housing 157a, by means of a pair of headed screws 173 which extends through a plate 174 superimposed upon the anchored end of the spring and which also extend through the spring and are screw-threaded into holes in the lug 172; these holes being shown in FIGURES 61, 62, 63 and 65.

As shown in FIGURES 8, 9, 27 and 28, to the free end of the flexure-spring 165, the cross-bar 175 of a bifurcated or twin-armed pivot-member 176 is secured, by riveting or otherwise, and in the cross-bar 175 a pair of opposed thrust-bearing cups 177a and 177b are secured (by pressing them into suitable cups or apertures formed in said cross-piece or by any other suitable means).

Within the upper full-circular portion of the coupling-tube 160, a bearing block 178 (FIGURE 8) is slidably mounted, having a conical bearing recess on the underside thereof, and a helical compression spring 179 is interposed between the top of the bearing block 178 and the underside of the tube-closure or collar 166b, thereby urging the bearing block 178 downwardly.

The coupling-pins 161a and 161b are interposed, axially, in the manner indicated in FIGURE 8, between the bearing screw 170, and bearing cup 177a, and between the bearing block 178 and the bearing cup 177b, respectively. The spring 179 being stronger than the flat cantilever spring 165, the free end of the spring 165 will always be firmly held, longitudinally, in relation to the coupling-tube 160, so that the coupling-tube 160 and coupling-pins 161 will always move and act as a unit, in moving the flexure-spring in either direction; all without axial slack, while providing a small though adequate lateral freedom of displacement between the tube-axis and the end of the spring 165.

Intermediate the proportional-bellows section 103 and the reset-bellows section 105, the nozzle and input section 104 is disposed (FIGURES 1, 7–11) formed of the nozzle-section 180 (FIGURES 9, 10 and 73) and the input section 181 (FIGURES 9, 10, 74 and 75).

Similar nozzle-supply passageways 182–R and 182–L are extended through the bellows housing 157, as shown in FIGURE 10. Only one of these passageways is operative however in any one controller, namely, that one which is positioned to be at the front of the controller, namely in registration with the nozzle-supply passageway 151 in the partition section 102. In FIGURE 10 which represents a right-hand controller, the passageway has been marked with a capital R indicating that it is the passageway operative in the right-hand controller.

A nozzle-passageway 183, in registration with the nozzle-passageway 182–R or 182–L (as the case may be) is provided at an angle to the nozzle-chamber 184 which extends through the nozzle-section 180 as shown in FIGURES 69 to 71. While two such passageways as shown, one marked R and one marked L, only one is used in a particular controller; 183–R being provided for right-hand controllers and 183–L being provided for left-hand controllers. This choice may be made by drilling only one of these, or, if desired, both may be drilled so that a single nozzle-section 180 need be used, and the passageway 183 not intended to be operative may be closed off at its outer end by a small imperforate washer interposed between the nozzle-section 180 and the section adjacent above it.

The nozzle-chamber 184 may be provided, as in FIGURE 73, with a brass or similar bushing 185, which may be placed into the nozzle-section during the casting thereof, although this bushing is not altogether essential or dispensable. Where such bushing is used, a hole, of course, is extended through it, in alignment with the nozzle-supply passageway 183.

Either the outer end of the nozzle-chamber or the outer bore of the nozzle bushing 185 is screw-threaded as at 186.

A generally tubular nozzle-member 187 (FIGURES 18 and 10) is mounted within the nozzle-chamber, with its outer and enlarged-diameter portion screw-threaded into the nozzle-chamber or into the bore of the bushing 185 and locked therein by the lock nut 188. An air-receiving angular groove 189 is provided in the nozzle-member 187, from which radial hole 190 extends into the hollow interior of the nozzle-member 187. The air-receiving groove 189 is, in turn, flanked by a pair of similar ring-receiving grooves 191, within which a pair of similar O- rings 192 are mounted for hermetically sealing the main body of the nozzle-member 187 against the interior bore of the nozzle-chamber or bushing 185, on either side of the air-receiving groove 189.

In this manner the nozzle-supply air delivered through the passageway 183, is delivered exclusively to the interior of the nozzle-member 187, and through it to the small final discharge aperture 193 in the tip of the nozzle. The outer end of the axial passageway through the nozzle-member is normally closed off, air-tight, by a screw-plug 194, which outer end is either slotted or provided with an Allen type wrench recess, and whose inner end is conical and forms a metal to metal air-tight seal with the periphery of the offsetting shoulder 195 between the two different diametered bore portions of the tubular nozzle-member, when tightly screwed in place.

As the discharge through the nozzle-tip is restricted, such restriction of the air-discharge through the nozzle raises the pressure of the output-air through the action upon and through the relay, thereby similarly or correspondingly to increase the action of the final control element such as the air motor operating the final control valve or member; or in the manner more fully described hereinafter.

The output port 111 in the relay-body 108 is connected, by means of the air interconnector 107 (FIGURES 10 and 13) both to the output opening 196, through the tube or passageways 197 and to the feed-back port 112 in the relay-body 108, throuh the passageways 156 and 198, thereby impressing the output pressure upon the feed-back passageway 153 which extends first laterally then upwardly through the relay-body 108 as shown in FIGURES 11, 14 and 56 and then to the feed-back passageway 154 in the partition member 127. A pair of opposite feed-back passageways 199–R and 199–L (FIGURE 14) extend upwardly through the vertical wall of the bellows-chamber housing 157 as shown in FIGURES 14 and 66 and terminate in corresponding valve-chambers 200–R and 200–L extending horizontally from opposed sides of the bellows-chamber housing 157. Each of the valve-chambers 200 is of two successive diameters. The two valve-chambers are separated by partition wall 201, so that they are not in communication with each other.

A passageway 202 is formed vertically between one of the two valve-chambers 200 and the interior of the bellows-chamber housing 157, interconnecting (through that valve-chamber) the corresponding feed-back passageway 199 is with the feed-back passageways 154 and 153. This communicating passageway 202 may be formed by drilling the wall at that spot.

Smaller-diametered reset passageways 203–R and 203–L are provided on the other side of the valve-chambers 200, terminating in enlarged ring-receiving recesses 204 (see FIGURES 11 and 67) in which an O-ring is placed to form an air-tight connection between the passageway 203 and the reset passageway 205 continued in the nozzle-section 180. The nozzle-section passageway 205 in turn registers with the reset passageway 203–L, in the upper bellows-chamber housing 157–b (provided with similar feed-back passageways and valve-chamber as last-described, but placed in an inverted position in relation to the member 257–a). Thus feed-back air-pressure is delivered to reset section 105.

Within the valve-chambers 200, needle valves are disposed, which are more fully described hereinafter, the lower valve 205–a becoming a derivative setting valve, superimposing a first time-derivative upon the proportional action of the controller, while the valve 205–b functions as a reset valve affecting the time response of the reset bellows 162–b.

When using a derivative valve for impressing a derivative function upon the proportional bellows 162–a, either the passageway 155 is left closed, or a stabilizing diaphragm 206 is interposed between the partition section 102 and the proportional bellows section 103 in the manner shown in FIGURES 8, 10 and 11. The diaphragm 206 is preferably metallic, as for instance Phosphor bronze, and its outer periphery is flanked, on either side, by sealing gaskets 169–a overlapping the entire contact face of the partition section 102, as shown particularly in FIGURE 57, and being provided only with holes through which the tie-rods (hereinafter described) may extend and holes for permitting communication between the feed-back passageway 151 and the nozzle-supply passageways 151 and 182 and a hole for providing communication between the feed back passageways 154 and 199. The periphery of the diaphragm 206 is similarly apertured.

As shown in FIGURES 59 and 60, webs of metal are left where the aperture 155 is to be provided and also at 207, between the upper and lower partitions of the passageway 154, when the member 127 is case, and the passageways formed or made effective by drilling or knocking out the thin fracturable webs. Although passageways are opened on both sides, only one side is active, by reason of the gasketing above.

Around the reduced-diametered inwardly-extending portion of the nozzle-member 187, a gear-member 210 is revolvably mounted and journaled in a manner indicated in FIGURES 10 and 15–17. The gear-member is provided with gear teeth 211 around its outer periphery. The gear-member is provided with a slight radial-extending flange 212, projecting from its hub, at a slight distance from the main body of the gear, to form an angular groove therebetween. The flange 212 is recessed in a corresponding clearance recess 213 in the inner surface of the nozzle-section 180. A spring fork member 214, having a pair of flat spring prongs flanking the hub of the gear-member 210, overlaps the flange 212 thereof and exerts a resilient pressure or force upon the flange 212, to press the gear-member 210 against the flat surface of the recess 213. Thus, a revoluble flapper-carrying platform is formed by means of the gear-member, whose position relative to the nozzle-tip remains constant.

A flapper bearing bracket 216, formed of a base plate 217, and a pair of bearing-arms 218 extending at right angles therefrom. Base plate is provided with a clearance for the nozzle-member 187. Bearing bracket 216 is secured to the gear-member 210 by means of a pair of screws 219.

The bearing-arms 218 are provided with corresponding aligned threaded-openings 220, in which jewel-bearing screws 221 are threadedly mounted and secured in any desired adjusted position by means of a lock nut 222 threaded onto the outer ends of said screws. The inner ends of the jewel-bearing screws are provided with sockets for recesses in which bearing-jewels 223 are disposed and held in place by having the outer ends of the walls of the jewel-receiving socket of the screws spun over the outer peripheries of the jewels.

Between the jewel-bearings 223, the flapper or baffle 224 is mounted, with a flapper-plate 225 so juxtoposed to the tip of the nozzle as to be at a right angle to the nozzle-axis when the flapper-plate 225 is in contact with the nozzle, thereby to get the maximum shut-off of air-escape at the nozzle-tip.

The flapper member as a whole is preferably formed in a generally U-shaped cross-section as indicated in FIGURES 17 and 18, with the flapper-plate 225 constituting one leg of the U and with the other leg 226 of the U constituting a deflector plate, against whose longitudinal edge 227 the resultant of mechanical input-motion is applied, thereby to deflect the flapper-plate 225 away from the nozzle and thus permit the egress of air from the nozzle-tip in accordance with the deflection.

A pair of opposed trunnion-carrying plates 228 are extended from the flapper-plate 225, at a right angle thereto and towards the deflector plate 226. Through apertures in the trunnion-carrying ears, the riveted ends of trunnion sockets 229 are extended, and riveted over as shown in FIGURE 17; hard metallic trunnions 230 being secured in said socket members, axially, with their tapered bearing ends or cones entering into the somewhat wider-angled conical sockets of the bearing-jewels. The bearing-supporting arms 218 or the trunnion-carrying ears 228, or both, are made sufficiently resilient (either by themselves or in connection with their bases from which they are formed) that by entering the jewel-bearing screws 221 to slightly bow or stretch one or the other or both of these bearing-carrying arms, a delicate axial force may be maintained on the bearing contact, thereby eliminating any axial or radial play in the bearings.

A spiral hair-spring 231 is interposed between the flapper and the bracket 216, by having its inner convolutions secured to one of the two trunnion sockets 229 and having its outer end secured between the base plate 217 and the spring-locking plate 232 attached by the additional screws 233. The spring 231 exerts a torque upon the flapper, urging the flapper plate 225 towards the nozzle-tip.

This torque is just sufficient to close against the airstream and hence the torque produced is matched to the force of the nozzle air-jet, just sufficiently to overcome it, whereby the reaction of the deflector plate 226 upon the input mechanism is kept at a minimum.

The input section member 181 is provided with a pivot-receiving hole 235, spaced at suitable distance from the horizontal median plane of the member 181; this distance being equal to the distance between the two pivotal centers of the setting-input bellcrank lever 236.

A headed pivot member 237, with reduced-diametered threaded end, is screw-threaded into the hole 235, and locked therein by the transversely extending Allen screw 238 extended downwardly through a hole more or less tangential to the screw-threaded end of the pivot member 237; this locking screw 238 being in a threaded hole opening from the base surface or horizontal surface of the input member 181.

The setting-input lever 236, has its inner end 239 bent backwardly upon itself to form a generally U-shaped pivot-supporting yoke whose arm 240 is parallel to the lever 236 and is slightly resilient.

The input lever 236 is provided with a bellcrank arm 241, at a right angle thereto, having a bearing-sleeve 242 extending therethrough, and flared over at its thin end, to lock it to the bellcrank arm.

The input lever 236 and the bent back portion 240 thereof are each provided with apertures whose axis lies on the intersection of the median line of the lever 236 and a line at a right angle passing through the center of the bearing-sleeve 242; the distance between the axis of the apertures in the lever 236 and extension 240 thereof, and the axis of the bearing-sleeve 242 being equal to the distance from the center of the pivot receiving opening 235 to the median-plane between the two horizontal surfaces of the input member 181.

In the lower bearing aperture in the lever 236, a bearing-cup 244 is disposed, with its smaller end riveted or flared over to secure it in place; the bearing-cup 244 having a conical bearing-seat to receive a cone-point thrust and radial bearing or pivot end. The parallel lever extension 240 has a tubular sleeve 245 mounted in the aperture thereof, with its outer smaller-diametered portion riveted or flared over to hold it in place; sleeve 245 being threaded internally and receiving the bearing-screw 246 whose free end is provided with a conical concave bearing surface to receive a cone-point bearing end of the pivot or lock nut 247 on the screw 246 and locks it in any axially adjusted position.

The setting-input lever 236 with its bellcrank arm bearing-sleeve 242 and with its measurement-in-put-lever-receiving bearings 244 and 246, is pivotally mounted upon member 237, in the manner indicated in FIGURES 9 and 10, with an axially resilient thrust washer 248 interposed between the head 249 of the pivot member 237 and the end of the bearing-sleeve 242, so as to maintain the bearing-sleeve 242 and hence the setting-input lever 236 pressed against the vertical face of the input-member 181 and thus eliminate or minimize axial play and also lateral play.

The measurement-input lever 250, shown in FIGURES 8, 9, 22 and 23, formed of two parts 251 and 252, pivotally connected at 253, by means of a pivot member extending therethrough and riveted over each of the members 251 and 252 is provided with a bellcrank portion 254 and 255, respectively, extending transversely thereof, which in turn have bent over ears 256 and 257, respectively, disposed at a right angle thereto, and paralleling each other, as shown in FIGURES 8, 9, 22 and 23. A flat-leaf U-spring 258 is interposed between the ears 256 and 257, exerting a force thereon tending to urge them apart, and a headed screw 259 is extended freely through the ears 256 and threaded into the ear 257 adjustably to connect the two, against the force of the spring 258. By turning the screw, the angular disposition of the lever-member 251 is adjustable in relation to the lever-member 252, for the purpose of adjusting the measurement-input lever 250 to any variations in the linkage from the measurement-deviation recorder and also to adjust it to variations in gasket thickness etc., in the controller itself, the spring 258 taking up or eliminating any slack in this adjustment.

A pivot-pin 260 extends through the lever-member 252, at a right angle thereto, and is riveted in place by flaring over or swaging the portion which enters through the aperture in the lever. The opposed ends of the pivot-pin 260 are reduced in diameter and terminate in cone-pin bearing surfaces which are adapted to seat against the concave conical bearing surfaces in the bearing cup 244 and the bearing screw 246, respectively, as shown in FIGURES 9 and 20.

The outer or input ends of the levers 236 and 250 are provided with link pivoting holes 261 and 262, respectively, for the reception of the pivot pins of the respective input-links extending from the setting-arm and measurement-arm, respectively of the recorder, A link-pivoting hole 267 is provided in the bellcrank arm 255 of the lever-member 252 for the reception of the pivot-pin of the input-resultant link 268.

The distance 269 between the input link hole 262 and the axis of the pivot pin 260, when the screw 259 is so set as to bring the pivot points 262, 253 and 260 into alignment with each other (when they all lie in one straight line) is substantially equal to the distance 270 between the setting link pivot hole 261 and the axis of the pivot bearings 244 and 246.

The distance 271 between the axis of the pivot pin 260 and the input resultant link pivot hole 267 is equal to the distance 272 between the axis of the pivot bearings 244 and 246 and the axis of the bearing-sleeve 242. Also the line through the pivot points 260 and 267 is at a right angle to a straight line connecting the pivot points 262, 253 and 260, just as the corresponding lines on 236; hence levers 236 and 250 are geometrically similar.

By the construction just described, the pivot point 267 will coincide with the axis of the pivot 237, or substantially so, when the levers 236 and 250 are in horizontal alignment with each other or when their pivot points 260 and 261 are in horizontal alignment with each other (being modified very slightly perhaps imperceptibly to the extent of any deviation of the three pivot points 262, 253 and 260 from a single straight line. Because the pivot point 267 coincides with the axis of the pivot 237, simultaneous motion of the two levers 236 and 250, with their pivot holes 261 and 260 in alignment with each other, effects no displacement of the pivot point 267. However, if either one is moved in relation to the other, then the pivot hole 267 is moved laterally, swinging in an arc about the axis of the pivot pin 260 with any motion of the input lever 250 in relation to the lever 236, and in an arc about the axis of the pivot 237 for any motion of the setting lever 236.

The two arms 176 of the spring yoke 175 are provided with pivot pins or trunnions 234 which fit holes 273 in the flapper-deflecting frame 274, as shown particularly in FIGURES 8, 9, 10, 27 and 28, which is generally U-shaped in vertical cross-section taken in plane passing through top and bottom supporting pivots thereof and through the flapper deflecting pin, carried thereby, and includes the base portion 275 and the two legs 276 extending generally at a right angle thereto and sufficiently resilient (combined with the base) and tensioned inwardly, towards each other, so that when they are free they are generally non-parallel, and so that when the pin 277 is inserted between the free ends thereof, the free ends will exert a suitable axial force upon the pin, tending to keep the trunnions 278 thereof firmly in the holes 279 of the legs 276. One of the ends of the pivot pin is provided with an intermediate diametered portion 280, of a length slightly greater than the thickness of the link 268, slightly greater than the thickness of the resultant motion input link 268. The pivot-hole 281 in the end of the link 268 is of a diameter neatly to fit the diameter of the pivotal portion 280 of the pin 277. By reason of the slightly greater axial length of the pivotal portion 280 the inward force of the two spring-legs 276 does not exert any axial clamping or frictional action upon the link 268 but affords free pivotation between the pin 277 and the link 268.

From the base 275 of the frame 274 a generally U-shaped spring arm 282 (FIGURES 24–26) extends upwardly and back into the frame at a right angle to the plane in which the pivot holes 273 and 279 lie and terminates in a pair of fingers 283, and a central finger 284 which is generally curved or V-shaped in cross-section, to receive and hold the flapper-deflecting pin 285, in a manner indicated in FIGURES 24–26. The legs of the U-shaped pin-supporting arm 282 are such that the axis of the pin 285 will lie substantially in the plane in which the pivot holes 273 and 279 lie. A longitudinally aperture 286 (FIGURE 24) is formed through one of the two legs 276, namely the one nearest the revoluble flapper, and the pin 285 extends freely through this elongated aperture whose width is sufficient to give ample clearance laterally and whose length is sufficient to accommodate the maximum vertical adjustment of the pin within the frame 274.

A pair of aligned and non-circular holes are placed in the two legs of the U-arm 282 to receive a differential adjustment screw 287 (FIGURES 24 and 25). Into each of these non-circular holes an oppositely facing nut is mounted having a shoulder engaging the outer surface of the leg and a portion extending through the hole and interlocking therewith to prevent its rotation within the hole.

The bore of the upper nut is of a larger diameter than that of the lower nut and the two holes are threaded with threads of different pitch and the screw 287 is provided with correspondingly diametered and pitched thread-portions 290 and 291.

The input end of the link 268 carries a pivot-pin 292 which is pivoted in the hole 267 (FIGURE 22) of the bell-crank arm 252 of the measurement-input lever 250 (FIGURES 8, 9 and 20–22). The pivot trunnions 234 are, in turn, sprung into the pivot holes 273 in the frame 274 (FIGURES 24–27). In this manner the flapper-deflecting frame 274 is supported and floated on two horizontal axes 273 and 279, between which the flapper-deflecting pin 285 is disposed, and the position of the latter is determined by the vertical displacement or movement of the frame 274 by the arm 176 and by the feedback bellows or diaphragms which operate upon it, while the lateral position of the pin 285 is determined by the lateral movement of the link 268 (FIGURES 8 and 9), whose movement causes the frame 274 to be angularly oscillated about the pivotal axis 273. Conversely the up and down movement imparted to the frame 274 by the corresponding movement of the arms 276 will cause a slight lateral angular deflection of the frame about the axis 273, around the pivot point 267 to which the links 268 connect it.

The pin 285 is preferably centered so as to be coaxial with the nozzle-aperture 193 (FIGURES 10 and 18) when the output air-pressure is at the midpoint of the operating pressure-range in a proportional controller of the present invention. The adjustment of the screw 287 serves to achieve this coaxial disposition of the pin 285. A hole 294 may be provided in one or both of the legs of the U member 282, in order to weaken it and to provide greater resiliency or flexibility so as to permit the legs better to be sprung in relation to each other.

The distance of the edge 227 of the deflector plate 226 from the axis of the nozzle 193 is equal to the radius or one-half the diameter of the flapper-deflecting pin 285, so that in the aforementioned coaxial position of the pin 285, the rotation of the flapper supporting gear 210 will not cause the flapper to be deflected in relation to the nozzle. This position is shown in FIGURE 18.

To rotate the flapper-carrying gear 210 (FIGURES 15, 17 and 18), a small pinion 295 is provided upon a pinion shaft 296 journaled in a suitable bearing hole 297 in the nozzle-section 108, the pinion 295 being in mesh with the teeth 211 of the gear 210 (FIGURE 15). The shaft 297 extends to the outside of the section 180, and upon its reduced-diameter end a collar 298 is secured by suitable set screws 299, and a dial handle disc 300 is secured to the collar or sleeve 298 by telescoping the D-shaped hole in the disc over the correspondingly noncircular reduced portion 301 on the sleeve 298, and fastening it thereto by means of the screw 302. By this means the disc 300 is locked to the collar or sleeve 298 against relative rotation, while the sleeve, in turn, is angularly adjustable in relation to the pinion 295 and hence in relation to the flapper-carrying gear 210 by means of the set screws 299. Stop tongues 303–I are pressed out of the disc 300, and a stop-pin 304, at the same radius from the center of rotation, is carried by the nozzle section 180, thereby to limit the rotation of the disc 300. This limitation of the rotation of the disc 300 to something less than 360 degrees by the width of the tongue 303 and the thickness of the pin 304 limits the rotation of the flapper-carrying gear 210 to somewhat less than 90 degrees. The one limit of rotation of the gear 210 places the edge 227 of the deflector plate 226 at an angle slightly short of the vertical, while the opposite limit of rotation places the edge 227 at a slight angle to the horizontal. In the former extreme position the controller approaches an on-off action, namely one in which the input motion affects the maximum change in output pressure and in which the feedback functioning elements have the least effect in changing the output pressure. In the latter extreme position, namely the one slightly off the horizonal, the controller has its maximum throttling-range, namely one in which the input motions are the largest for any given change in output pressure and the feedback functions have the most effect on output pressure.

Thus, the rotation of the dial disc 300 has the effect of changing the ratio in which the vertical and horizontal motion-components of the flapper-deflecting pin 285 become effective upon the deflection of the flapper; thereby changing the throttling range or the proportioning band width of the controller.

The feed-back passageways 153–R, 154–R, and 199–R deliver the feedback air, which is also the output air, to the valve chamber 200–R and thence through the reduced feed-back passageways 203–R, 205–R and 203–L to the valve chamber 200–L (FIG. 11) and, through the passageway 155, also to the chamber beneath the diaphragm 206.

With the valve 205A (the details of the valve to be described more in detail hereinafter) opened to the limit of its available opening, or better yet with the elimination or removal of the valve in its entirety and merely the plugging of the outer end of the valve chamber (as shown in FIGURE 14) changes in feed-back pressure are exerted, without any time lag, upon the proportional bellows 162A.

In the embodiment shown in FIGURES 1 and 7 to 11 inclusive, the stabilizer diaphragm 206, in combination with the proportional bellows 162A results in a stabilization effect to overcome what otherwise would be an undesirable fluctuation in control-output which sometimes results from mechanical vibration of surrounding machinery or building structure, which are transmitted to the controller and vibrate the flapper thereof.

Thus, with a proportional controller, such as shown in FIGURES 8–10 and 14, which is without a derivative valve, any undesirable vibration of the flapper due to vibrations of the building or of surrounding machinery, is largely compensated for by a corresponding and almost instantaneous feed-back of the so disturbed pressure upon the proportional bellows, so that the fluctuations in the output pressure and hence in the ultimate control due to mechanical vibrations, are largely and almost instantaneously offset by corresponding impressions of the so-disturbed output pressure upon the proportional bellows and hence upon the flapper. Where such a controller (without a derivative valve) as shown in FIGURES 14 and 8–10 is used for controlling, for instance, an air-motored final-control-valve or damper, the response or rate of movement of the final control valve or damper is sufficiently slow that the quick counteracting effect of the feed-back upon the proportional bellows will result in no appreciable effect upon the final control valve or damper of such irregularities in output pressure due to mechanical vibration. However, where the derivative valve 205A is used, as in FIGURES 1 and 7–11 inclusive, and hence where the sole ingress of feed-back air to the proportional bellows 162A is through the derivative valve, the time-lag imposed upon the transmission or impression of such feed-back pressure or the variations therein upon the proportional bellows will permit substantial and effective responses, at the final control valve or damper, to such irregularities in output pressure due to these mechanical vibrations, unless these rapid fluctuations in output pressure, which are of high frequency but short duration, are quickly compensated for notwithstanding the delaying action of the derivative valve.

Moreover, these high-frequency variations in output pressure, due to these vibrations, would not only undesirably affect the final control element such as the final control valve, damper or the like, but also produce a confusing pressure-reading or pressure gauge in the output line commonly used to indicate valve position and hence the extent of the process-control. Thus, it is impossible for the observer to judge just what the position of the final control valve is or what the trend of the process is from time to time, because of these large and rapid fluctuations of output pressure due to vibration.

By inserting the diaphragm 206, and applying the feed-back air directly to the under side of the diaphragm through the large opening 155, while applying the same feedback air above the diaphragm and onto the exterior of the bellows 162A through the time-lag producing derivative valve 205A, any high frequency fluctuations in output pressure are transmitted to the bellows by the corresponding deflections of the diaphragm 206 which in turn correspondingly varies the momentary pressure effective upon the proportional bellows 162A by correspondingly decreasing or increasing the space within the bellows chamber 163A and correspondingly varying the pressure therein in accordance with the vibrational variations in the output pressure. However, for the slow or low-frequency changes in feed-back pressure due to changes in the process or the demands of the process, as shown by the measurement input, the diaphragm will be comparatively ineffective, in comparison to the application of the feed-back pressure through the derivative valve 205A, so that the diaphragm, under normal operating variations in feed-back pressure, is generally ineffective or immobilized.

In considering the action of the proportional reset controller it is easiest to visualize if we assume that during the period under consideration the reset valve is closed or that the period visualized is so short that there will be no appreciable air flow through the reset valve 205–b, and hence no variation of pressure in the reset chamber 163B. Accordingly, this chamber will act as a pneumatic spring coacting with the pneumatic force exerted on the proportioning bellows 162A to assume a deflection proportional to the output pressure. Each output pressure corresponds to a certain valve position; hence to secure a final control valve position corresponding to a given operating load necessarily means that a certain deflection of the proportional bellows results. This deflection is applied to the flexure spring 165 and to the flapper deflecting pin 285. Offsetting this feed-back deflection will be an input measurement deflection applied to the measurement lever 250 and link 268 onto the flapper deflecting pin. According to the angle of setting of the flapper edge 227 a fixed relationship between the feed-back motion and the measuring input motion exists whence to hold the required flapper nozzle relationship and corresponding output pressure for the certain definite input lever and measurement deviation is necessary.

Changes in process-load require corresponding changes in valve-position, which in turn are secured by corresponding changes in output pressure from the controller. These output pressures are impressed upon the proportioning bellows and by it translated into corresponding motions which are applied as one component upon the flapper motions. For any given setting of the proportioning dial (which turns the flapper-carrying gear), the flapper deflection is the resultant of input motion and feed-back motion (through the proportioning bellows) in a definite ratio (the ratio being selected by the proportioning dial). Hence for each control valve and corresponding feed-back motion or position, there must be a corresponding and related input lever position or measurement-deviation. Thus, for each position of the control valve there is a corresponding measurement deviation, and for a whole range of valve positions there is a corresponding range of measurement deviations.

Assuming that a proportioning reset controller is balanced out at 9 lbs. output pressure, namely, that with 9 lbs. feed-back pressure in the proportioning chamber and also in the reset chamber, the position of the measurement input lever and of the setting input lever will coincide and the flexure spring will be in its median position. If a change of load then requires 10 lbs. pressure on the control valve motor, this will require initially a corresponding deviation in measurement because of the proportioning action described above. With 10 lbs. in the proportioning chamber and only 9 lbs. on the reset chamber (due to the intervention of the reset valve which restricts the flow) there is a deflection of the flexure spring as well as of the input position. However, superimposed on the proportioning action is reset action. This pressure differential between the two chambers causes the air slowly to flow through the reset valve into the reset chamber. As the pressure in the reset chamber is gradually increased from 9 lbs. to 10, the flexure spring is slowly returned to its median position, and as it is slowly returned, the measurement-input position is likewise slowly returned to its setting position, while the output pressure is gradually raised above 10 lbs. requisite not only to carry the new operating load and corresponding control valve position, but also to overcome also the initial measurement deviation characteristic of proportional control action alone. Thus, the measurement input is returned to its normal or setting position or undeviated position, notwithstanding the continuance of the increased load.

Thus, in the proportional reset controller, the measurement may be maintained close to the predetermined setting notwithstanding variations in process-load. If the change in process load is slow, the measurement will be substantially maintained at its original setting, as these changes all occur gradually and simultaneously, while if the change in process load or deviation in measurement is sudden, there will be an initial offset, as in proportioning control without reset, followed by a gradual return of the measurement to its original setting. The reset valve or reset dial is to be set so that the resetting is not faster than the process can follow.

The time adjusting valves 205A and 205B are identical in construction. Each of these valves includes a tubular valve housing 306 having an outer retaining flange 307, an annular ring receiving groove 308 within which an O-ring 309 is disposed, forming a seal with the outermost portion of the valve-chamber 200, namely, between the outer wall of the bellows section and the feed-back passageway 202 and passageway 199. Just inwardly of the ring receiving groove 308, the outer diameter of the tubular valve housing is stepped to a smaller diameter to provide a clearance within the main or outer portion of the valve chamber, so that the air may freely flow from the passageway 199 into the passageway 202, around the outside of the tubular valve body.

On the other side of the passageway 199, the outer diameter of the tubular valve housing 306 is again stepped down in diameter, forming a shoulder 310. An O-ring 311 is interposed between the shoulder 310 and the shoulder 312 in the valve chamber. This O-ring serves as a seal between the feed-back passageway 199 and the port 202 leading into the bellows chamber from the inner end of the valve chamber. The valve seat is formed as a relatively long conical interior surface in a valve-seat tube or sleeve 313, which is tightly fitted into the interior bore of the tubular valve body 306 and rests against the shoulder 314 thereof. The movable valve element is a correspondingly tapered conical plug 315. The tapered plug 315 is urged in a seating direction in relation to the sleeve 313 by a helical compression spring 316, through a pressure block or follower block 317 which abuts the large end of the plug 315; the other end of the spring being supported by the spring-anchorage pin 318 extending through the wall of the inner end of the tubular valve housing. A valve-adjusting screw-plug 319 is screw-threadedly mounted within the outer portion of the bore of the valve housing 306, and has an inner unthreaded cylindrical portion of slightly smaller diameter which rides within the cylindrical unthreaded inner bore of the valve housing and contains a ring receiving groove 320 within which an O-ring 321 is disposed, which seals the inner end of the valve-adjusting plug 319 hermetically against the inner wall of the valve housing 306. A dial and operating disc 322 is mounted upon a small reduced-diameter outer portion of the plug 319, which is non-circular or with a flat formed thereon, which keys the disc thereto; the disc having its central hole likewise formed with a flat or otherwise out of round or non-circular. The disc is held by screw 323 to the plug 319.

The flange 307 is in turn overlapped and engaged by the head of the screw 324, which holds the valve housing 306 within the valve chamber 200 and also locks the housing 306 in any angular position in which it may be set in relation to the valve chamber.

The disc 322 is provided with a stop-ear or projection 303 similar to that provided on the disc 300, which stops against the head of the screw 324, to limit the rotation of the disc 322 and of the valve-adjusting screw-plug 319 to less than 360 degrees. The advancement of the screw plug 319 unseats the tapered plug 315 from the inner tapered valve-seat bore of the sleeve 313, to permit the passage of feed-back air from the passageway 199 into the bellows chamber 163. The taper is made sufficiently gradual so that a suitably fine adjustment is achieved for the given amount of turning of the screw. The taper and the length so related to the pitch of the screw 319, so that a suitable resistance is imposed to the passage of the air, and the time-factor adequately set to within the desired limits, and desired working scale range of time will be distributed over the available rotation of the screw plug as limited as aforesaid. The axial length of the tapered valve seat is made relatively long, so that the necessary resistance-range is produced without unduly fine clearances between the stationary and movable valve surfaces; reliance upon too fine a clearance before the air-restricting or delaying passageway having been found to be undesirable in operation.

The follower block 317 is appreciably smaller than the portion of the bore of the valve housing 306 in which it is disposed, both to permit the free passage of air around it, and also to cause the natural skewing effect of the spring 316 to exert a slightly off center force upon the large end of the taper plug 315, thereby to cause the tapered plug always to bear against the side walls of the tapered hole, oppositely at the two ends, or to cock the plug, so that it will be touching the tapered bore, though unseated therefrom. By so cocking the plug while unseated, a greater repeatability of air resistance is obtainable for any setting of the dial disc (than if the plug were attempted to be centered or were permitted to assume, at random, either a more or less coaxial position when unseated or random eccentric position when unseated). In actual operation the dial and operating disc 322, and the angular position of the housing 306 so set, and the screw plus 319 is so set, that in the longest time-setting of the dial the valve plug is just unseated, and so that for the lowest or shortest time setting of the dial, the plug 315 will be unseated the maximum of its valve-setting range.

The proportional reset controller shown in FIGURE 2 is also represented in FIGURES 8–10 and 12–14, and is in all respects like the proportional reset derivative controller of FIGURES 1 and 7–13, with the derivative valve 205A and the stabilizing diaphragm 206 omitted. The valve chamber 200R is hermetically sealed at its outer end by a flanged closure plug 326 having a ring-receiving groove 327 in which an O-ring 328 is disposed which seals the telescoped portion of the plug against the side wall of the chamber at a point between the outer wall of the bellows housing and the feed-back passageway 205. The plug 326 is secured in place by a screw 324 whose head overlaps the flange of the plug and which is screw-threaded into the body of the bellows housing.

A sealing gasket 168A is interposed between the partition member 127 constituting the section 102 and the bellows housing 157A. Thus, in the proportional reset controller of the present invention the interior of the bellows chamber 163A constituting the proportion bellows section 103 and the interior of the partition housing 127 constituting the section 102 are merged into a single bellows-receiving chamber.

For greater ease of convertibility we may leave the diaphragm 206 between the sections 102 and 103 in the proportional reset controllers where the controller is to be used for processes involving slow rates of response, and hence where the reset valve is set for a relatively long time interval and where, therefore, it may be desirable to add a derivative valve and superimpose the derivative function upon the proportioning reset control action. By so leaving the diaphragm 206 intervening the two sections 102 and 103 (without the derivative valve) the controller will still function as a straight proportioning reset controller; the feed-back air being applied to the opposite sides of the diaphragm equally and simultaneously at all times through the passageways 154, 199 and 202 on the one hand and through the passageways 154, 155 on the other hand. However, where the process changes or changes in the process demand are rapid, the diaphragm is omitted as a straight proportional reset controller is desired and a derivative valve and function are unlikely to be added.

The construction of the proportional controller shown in FIGURES 3 and 31–37 inclusive is the same as the proportioning reset controller heretofore described, but with the reset section 105 omitted and the coupling tube 160 likewise omitted, and a reaction spring 329 is mounted beam fashion between two diagonally opposite corners of the closure section 106, to provide a spring-reaction against the proportioning bellows which takes the place of the reacting force supplied by the reset bellows in the proportioning reset controller. To mount the flat strip spring in beam fashion diagonally across the partition housing 127B which constitutes the closure section 106 of the proportioning controller of FIGURES 3 and 31–37, a channel 330 and 331 is cut or milled or otherwise formed across the side walls of the member, to a width slightly greater than the width of the spring strip, and a pair of receiving sockets for balls 332 is formed at the rear channel 330, and a screw hole placed therebetween, while at the front channel 331 a flanged screw-threaded bushing 333 is inserted through a horizontal wall of the member 127B screw threadedly to receive the adjusting screw 334. The strip spring has a bearing cup 335 with concave conical bearing surfaces attached at the center thereof, and is provided with a pair of ball-receiving sockets or depressions and a hole therebetween loosely to receive the retaining screw 336. The screw 336 is not screwed down tight on the spring but its head spaced sufficiently from the spring to permit the free flexure of the spring with the two bearing balls as a fulcrum. At the offset end the point of the screw 334 serves as an adjustable fulcrum that is adjustable vertically to vary the force of the spring.

The proportional bellows 162A is similarly provided with the terminal enclosure disc 164a and bearing screw 170 which is held by the nut 338. The bearing members 339A and 339B are like the bearing members 177A and 177B, respectively, and are similarly secured to the flexure spring by being pressed into the cross piece 175 which, in turn, is riveted to the flexure spring, but differ from the bearing members 177 in that they are provided with long cup-like extensions to facilitate the assembly of the coupling pins 161 and to prevent them from falling out while the assembly is being handled or is in shipment.

In this proportional controller the position of the proportional range may be shifted by the adjustment of the tension of the spring 329 by the manual spring adjusting knob 340. Where it is desired to omit the manual reset knob a plain set screw 341 with a lock nut 342 may be provided as shown in FIGURE 38.

The proportional controller of FIGURES 31–37 has a wide proportioning band as, for instance, 10 to 500% of scale span for a full range of control valve motion, and hence is known as a wide-band proportional controller. This is the same range as in the proportioning reset derivative controller and the proportioning reset controller hereinabove described.

Where the narrow proportional range is desired as in the controllers of FIGURES 4 and 39–43, the proportioning bellows 162a is replaced by a metallic diaphragm 343, of suitable spring metal and suitable stiffness and stroke, mounted (by soldering or otherwise) upon a diaphragm-carrying ring 344 having a circular opening but whose outside periphery matches the outside periphery of the housing members 127A and 157A; said diaphragm-mounting ring 344 being flanked by a sealing gasket 168a in the manner hereinabove described. In this embodiment the ring 344 and flanking gasket 168A seal off the upper end of the feed-back passageway 154 so that the feed-back air is admitted only to the underside of the diaphragm 343 through the passageway 155.

The reaction-spring 129 and the upper coupling pin 161b of the wide-band type are omitted, and the air-force acting upon the underside of the diaphragm 343 is opposed only by the force of the flexure spring 165 and the spring-force of the diaphragm itself.

In this embodiment, the pin-bearing is provided by a cup 345 riveted through the diaphragm 343 and a reinforcing washer 346 on the upper side of the diaphragm.

As the stroke or displacement of the diaphragm 343 is comparatively small, the feed-back motion is correspondingly limited, and hence a narrow or relatively small range of proportioning action is produced, of the order of 1 to 30% of the scale span for full range of pressure at the controller.

In the off-on controller shown in FIGURES 5 and 46 to 48, inclusive, the lower housing member 157 which in the wide band proportioning controllers constitutes the bellows-housing and section 103, is likewise omitted and a nozzle member 348 is mounted with its main axis coaxially disposed to the pivot member 237. In this embodiment the input and nozzle section 105 is formed of two identical sections 350F and 350R, for the front and rear housing portions thereof respectively; this member being in detail in FIGURES 76 to 78.

The valve receiving aperture 35 and the threaded pivot-receiving aperture 235 are at the same horizontal level and are at equal distances from the respective ends of member 350 so that when used as a rear section member 350R the threaded pivot-receiving aperture 235 will be coaxial with the nozzle-receiving aperture 351 in the front section member 350F, as shown in FIGURES 47, 48 and 53 (the arrangement in FIGURE 53 merely showing a left-handed on-off controller wherein the two section members 350F and 350R are inverted to bring the apertures 355 and 235 thereof to the right side, thereby facing the surface 353 thereof downwardly).

In the on-off controller the nozzle member 348 includes a reduced diameter portion 359 which is adapted to be disposed within the nozzle-receiving aperture 351, and an enlarged diameter portion 360 in which the nozzle opening 361 is radially disposed, and a flapper bracket-carrying extension stem 362 preferably integral with the portions 359 and 360, to which the flapper-carrying bracket 363 is secured by means of the radial screw 364 and axial screw 365.

The flapper-carrying bracket is generally U-shaped or channel shaped in cross section and includes the central main web 366 and the side flanges 367 which are provided with aligned threaded bearing-receiving apertures 220 similar to that shown in FIGURE 7 whose common axis is at a right angle to the main axis of the nozzle member 348 but lies in the same plane as that in which the main axis of the nozzle member 348 lies, as shown particularly in FIGURES 49 and 50. Within the bearing apertures 220 jewel bearing screws 221 are threadedly disposed and locked into adjusted position by the lock nuts 222 in the same manner as that indicated in FIGURE 17. From the central web 366 of the bracket 363 a flange 368 is bent at a right angle, through which the axial screw 365 is extended.

The flapper member 369 includes the generally elongated flapper portion 370, the deflector plate 371 having the deflector edge 372 and the bearing ears 373 to which pivot cups 229 are riveted in the manner indicated in FIGURE 18 in which the cone pin bearing pivots 230 are disposed.

The flapper member 369 is sprung between the bearing-carrying flanges 367 of the bracket 363 and the bearing-pressure adjusted as mentioned hereinabove, and the hairspring 231 is interposed between one of the cups 229 and the spring-anchorage screw 374 whereby the flapper 370 is urged towards the nozzle head 360, through which the radial nozzle opening 361 is extended in communication with the nozzle-supply passageway 377 and the annular air-supply groove 378. The air-supply groove 378 is, in turn, in alignment with the nozzle-supply hole 183. The end of the flapper 370 overlies the nozzle opening 361 and serves to control the discharge of air therefrom.

The deflector edge 372 of the flapper 369 is spaced from the main axis of the nozzle member 348 a distance equal to the radius of the deflector pin 285, so that when the deflector pin is in its neutral position, namely, coaxial with pivot member 237, the nozzle and flapper assembly may be rotated within its nozzle-receiving hole 351, without unseating the end of the flapper 370 from its nozzle closing position on the nozzle aperture bead 376 or separating deflector edge 372 from pin 285.

The terminal portion 379 which extends beyond the outer wall of the section member 350F is provided with a flat, to receive the D-hole of a reversing disc 380 which is affixed thereto by means of a screw 381. The disc has two diametrically opposite holes 382 therein. A single screw-threaded hole 383 in the section member 350, at the same radial distance from the nozzle aperture 351 as the holes 382, serves to receive a lock screw 384. These holes are so positioned that when either disc hole 382 is in alignment with the housing hole 383, the axis of pivotation of the flapper is in a generally vertical plane, the alignment of the one disc hole placing the deflector edge 372 on the one side of the deflector pin 285, as in FIGURE 47, while the alignment of the other disc hole places said deflector edge 372 on the opposite side of the deflector pin 285 as in FIGURE 52. By this reversal of the position of the nozzle and flapper assembly and the consequent reversal of the relationship between deflector edge and deflector pin, the action of the on-off controller is reversed.

In the on-off controller a recess 285 is provided on the inner face of the section member 350, beneath the pivot hole 235, to provide a clearance for the adjustable pivot screw 246, which in this embodiment is placed on the opposite side of the bell crank arm 236, as shown in FIGURE 46.

To use a controller of the present invention as a transmitter to receive a measurement-motion from a measuring element such as, for instance, a rotameter, a temperature responsive Bourdon tube, etc., a wide band controller such as shown in FIGURES 3 and 31 to 35 may be used, with the setting lever 236 locked in its horizontal position and the measurement-motion-transmitting link connected to the lever 250, and with the set screw 341 used instead of the dial 340, and locked in its position by the nut 342, and the flapper-carrying gear 210 locked in its 100% proportional band position and the dial 300 thereof removed. Of course simplifications of structure may be introduced to eliminate entirely unused adjustment features.

The output pressure from such transmitter may then be delivered pneumatically to a remote indicating, recording or controlling instrument or directly to the air-motor of the final controlling valve or damper or the like or to an intermediate positioning-relay for such air-motor. Thus, for instance, the output-pressure of such transmitter (so locked at or near the point of measurement and receiving its input-motion more or less directly from the measuring instrument) may be impressed upon a pneumatic motion-translator or transducer, which develops mechanical motion from a pneumatic input for operating a mechanical indicator or a mechanical recorder or for operating the mechanical-motion-input levers 236 or 250 (or each from a separate transmitter) of the controllers of the present invention. The controllers of the present invention may, in turn, derive their two mechanical input motions for the levers 236 and 250 from the setting arm and recording arm, respectively, of an indicator and recorder whose setting arm or recording arm (or each) is actuated from such a transmitter located at the remote location.

The controllers of the present invention are so constructed and arranged that they have multiple planes of symmetry, these planes of symmetry being planes of pneumatic symmetry, tie-rod symmetry, external symmetry. By reason of these planes of symmetry, the components forming the housing and pneumatic sections and operating sections may be reversed in direction from left to right or vice versa, may be inverted from bottom to top and vice versa, and their functions may be changed, without changing their construction; whereby a relatively few section members or components will produce a comparatively large repertoire of controllers.

These planes om symmetry are pointed out more particularly hereinbefow.

Referring to FIGURES 79 to 82, which represent proportioning reset derivative or proportioning reset controllers, like those in FIGURES 1 and 2 and 7 to 11 inclusive and 14, but which section FIGURES 81 and 82 are taken in different planes from that shown in the earlier figures.

The controller and its various sections have two main planes of pneumatic symmetry, PS–1 and PS–2 indicated in FIGURE 79.

The bellows sections 103 and 105 or the number 157 which forms these sections, are pneumatically symmetrical about plane PS–2, while the member 127 to which forms sections 102 and 106 has pneumatic symmetry about plane PS–1.

The nozzle section 180 has a pneumatic symmetry about a horizontal plane PS–3, passing through the axis of the nozzle-receiving hole 184, while the modified or on-off nozzle and input section 350 has a pneumatic symmetry about a horizontal plane PS–4 passing through its nozzle-receiving hole.

The tie-rod or screw-holes of all sections of the controller are symmetrical about both planes PS–1 and PS–2.

The holes 391 in the relay section 101, as well as the holes 392 in the partitioned sections 102 and 106, are all unthreaded through-holes loosely fitting the tie-rod or tie-screws.

In the numbers 175A and 157B which form the bellows sections, the holes 393 and 394 are unthreaded through-holes or "clearance holes," and the holes 395 are tapped holes, seen only on the open end of the section, as indicated in FIGURES 80 and 81, when the number is used for the reset-section 105. When used for the proportional section 103, only the holes 393 are through-holes of clearance-diameter, whereas the holes 394, now called 396, each is tapped from both ends, whereas the holes 395 as before are blind holes tapped only from the open end of the housing shown in FIGURE 63.

The nozzle section, 180, as shown in FIGURES 68 to 73, has one through-hole 397, of clearance diameter, and opposite and aligned tapped holes 398 and 399. In the right hand proportional reset controller, the through-hole 397 is in registration with the tapped hole 394 in the proportioning bellows section and with the through-hole 393 in the reset section, whereas the tapped holes 398 and 399 are in registration with the clearance-hole 393 in the proportional section and the clearance-hole 394 in the reset section as shown in FIGURE 22.

The input section 181, is similarly provided with a through-hole 397 of clearance-diameter and either a through-hole 398 tapped from both ends or two coaxial tapped blind holes 398 and 399, which correspondingly receive a through rod or the tapped end of a rod, respectively.

The section 350 shown in FIGURES 76 to 78 used both for the nozzle as well as for the input in the on-off controller is provided with blind tapped holes 398 and 399, corresponding to the similarly numbered blind holes in the nozzle section 180, but instead of the through-hole 397 of clearance-diameter, are provided with another set of similarly located blind, tapped holes.

The number 157 forming both the proportioning section as well as the reset section, is provided with four dowel pins, preferably formed integrally therewith and projecting from the horizontally closing wall thereof, 400, and the sections 180 and 181 are provided with corresponding dowel-holes 401, adapted to receive the dowel pins. Section 350 which is not used with 157 requires no dowel holes 401.

In the proportional reset controllers, five lengths of screws or tie-rods are used, clearing through and threading into the successive sections in the manner shown in FIGURES 78 to 81.

Thus the six bottom screws 387 clear through the relay section 101 and the partition section 102 and thread into the proportioning bellows section 103, while the two bottom screws 389 extend through these sections as well as through the proportioning bellows section 104, and one of them threads into the nozzle section 180 and the other into the input section 181.

The four top screws 386 extend through the top section 106 and thread into the reset section 102 in the manner indicated in FIGURE 81.

The two top screws 388 clear through the sections 106 and 105, and one of them threads into the nozzle section 180 and the other into the input section 181. The two top screws 390 clear through the sections 106, and 105 and one of them clears through the nozzle section 180 and the other through the input section 181, and then both thread into the proportioning bellows section 103.

By this construction the controller can be separated or disassembled at will along several planes, without disturbing the assembly in the other planes.

Thus, for instance, to remove the relay, all the bottom screws are removed and this releases the relay body (and also the partition section 102). This permits servicing of the relay section and also gives access to the proportioning bellows.

If it is then desired to separate an input or nozzle section 104 it is merely necessary to remove screw 170 and the top screws 388 and 390 and such separation is obtained without opening the reset chamber or proportional chamber.

By taking out all the top screws, the reset chamber may be opened without disturbing the lower part of the controller, and by removing screw 171 it may be separated.

Correspondingly, the narrow band and wide band proportioning controllers hereinabove described, have three lengths of tie-screws, namely, the bottom screws 387 and 389, while the top screws are merely those corresponding to screws 388 and 390, are shortened only by the vertical height of the omitted reset section, but otherwise being related to the front and back nozzle and nozzle section 180 and input section 181 in the same manner as screws 390 and 388 are related in FIGURE 82. This provides for separation of the relay and of the lower section 102 by the removal of all the bottom screws, or, in the alternative, it also provides for the separation in the plane either directly below or directly above the nozzle and input section, since these controllers are not tied together by the tube 160. A single section 104 may be separated by removing three of the four top screws. In the on-off controller also only four top screws are used and these are like screws 386, and all of them thread into the nozzle and input sections 350F and 350R. The bottom screws are of two lengths, four each, the four longer ones clearing through the section 102 and threading into the nozzle and input sections 350F and 350R, while shorter screws are extended through the relay flange and the corresponding holes in section 102 and secured by putting nuts on the other side of the section.

A ratio mechanism such as that shown generally in FIGURES 4 to 7 of Brewer Patent 2,481,496 and as shown in FIGURES 6 and 83 to 86 inclusive may be combined with any of the controllers hereinabove described and shown in the drawings, as, for instance, the proportioning reset controller shown in FIGURES 2 and 6, the wide band proportioning controller shown in FIGURE 3, the narrow band proportioning controller shown in FIGURE 4, the proportioning reset derivative controller shown in FIGURE 1 and the on and off controller shown in FIGURE 5. To combine the ratio mechanism with the controllers of the present invention and thus to form a part thereof, the ratio mechanism shown in FIGURES 1 and 82 to 85 inclusive is provided with a base 410 formed integrally with the housing designated generally by the numeral 411, between whose parallel vertical walls 412 and 413 the ratio mechanism is mounted; the base 410 having three or more tie-rod-receiving apertures 414, and 415 matching three of the holes in the partition member 127 which forms (inter alia) the cover-section 106 of the controllers of the present invention. Two of the holes 414 receive the short tie-rods or screws corresponding to the screws 386, but lengthened by the effective thickness of the base 410, while the hole 415 is to receive the tie-rod or screw corresponding to rod 388, but correspondingly lengthened.

With the other screw shown in FIGURE 79 remaining, the ratio mechanism can be removed without removing the closure section 106 (or without removing or disassembling any of the lower sections).

The ratio mechanism shown in FIGURES 6 and 83 to 86 includes similar and preferably coaxial input shafts 416 and 417, suitably journaled in the opposite side walls 412 and 413, respectively, having input levers 418 and 419, respectively, affixed thereto through suitable adjusting sectors 420 and adjustment clamp screws 421; the input lever 418 also having a longitudinal screw-adjustment 422 which carries the link-anchorage 423 whereby the effective length of the lever 418 may be adjusted. Thus, the link-anchorage member 423 has a generally U-shaped base or portion, through which the adjustment screw 424 extends and upon which it is threadedly mounted; the adjustment screw 424 being, in turn, journaled at its two ends (and being axially fixed in relation to the two journal ears 425 and 426) bent from and at right angles to the lever 418.

To the inner ends of each of the shafts 417 and 418 a beam-carrying arm 427 and 428, respectively, is secured (preferably detachably) by means of the screw clamped yokes 429. A ratio beam 430 is pivotally mounted between the two pivots 431 and 432, respectively, at the ends of the levers 427 and 428; the beam 430 being provided with a pivot hole 433 at one end thereof to receive the pivot pin 431, while at the other end thereof it is provided with a nicely-fitted slot 434, to receive the pivot pin 432 and to permit the latter to ride to and fro within the slot to accommodate the differences in the center-distance between the two pivots 431 and 432. A link-carrying pin 436 passes through and is slidably mounted within the arcuate slot 437 in the beam 430. Upon this pin a generally U-shaped displacement or shifter yoke 435 is mounted, flanking the beam 430. Upon the same pin, and flanking the shifter yoke 435, is mounted the forked end 438 of the ratio-deviation transmitting link 439, which then supplies the input-motion to the lever 250 of the controller (the setting lever 236 of such controller being locked in horizontal position. A rack 440 is slidably mounted against the front wall 412 of the housing 411 operating on headed pin 442, whose head 446 also bears against the side of the rack, as a fulcrum, is raised into mesh with setting pinion 441 above it by the cantilever spring 443 beneath it and bearing upwardly against it, which in turn is held between pins 444 and 445. The bearing point 447 of the spring 443 is to the right of the axis-line of the pinion 441, while the pin 442 is to the left of it, so that the spring will cause the rack at all times to bear downwardly on the pin 442, and at the same time upwardly into shake-free engagement with pinion 441. The rack carries a pin 448 at one end thereof, to which the ratio-shifting link 449 is pivotally secured. The opposite end of the link 449 in turn carries the shifting yoke 435, preferably formed integrally therewith.

The pinion-shaft 450 is suitably journaled in the bearing 451 and extends forwardly and carries the ratio-setting dial 452, which is adjustably secured to the hub 453 affixed to the shaft 450, by means of screws 454.

The ratio-deviation link 439 may be pivoted directly to the pivot hole 262, hereinabove referred to, or to a separate inner pivot hole 455 whereby the effect of the motion of the link 439 is increased to compensate for the loss of motion due to the ratio mechanism, so that the proportional dial readings on the disc 300 may remain the same.

In FIGURES 87 to 89, inclusive, we have illustrated the reversibility from right to left of the controllers of the present invention. While this illustration of right-to-left and left-to-right reversibility is shown in connection with the proportoning reset derivative controllers illustrated in FIGURES 1 and 7 to 11, the same principle of this kind of reversibility applies to the other controllers shown in FIGURES 2 to 5, inclusive, with the same effect, for their corresponding sections.

Referring to FIGURES 88 and 89, the bellows-housing members 157A and 157B are rotated 180° about a vertical axis, and the nozzle section 180 and input section 181 are rotated 180° about a horizontal fore-and-aft axis. With the rotation of the nozzle and input sections 180 and 181 the diaphragm-coupling tube and the coupling pins 161A and 161B as well as the spring 179 and spring block 178 are likewise rotated 180° about the aforesaid horizontal axis.

Neither the relay section 101 nor the partition section 102 nor the diaphragm 206 nor the top section 106 are rotated.

In addition to rotating the diaphragm housings 157A and 157B, the opposite passageways 202L are controlled instead of the holes 202R, and similarly the "L" holes 203 are used instead of the "R" holes 203 and so on. Similarly the "L" holes 183 are used instead of the "R" holes 183.

While in the foregoing description and accompanying drawings the controllers have been shown and described uniformly as having the relay at the bottom and the closure at the top and the other sections correspondingly disposed in a vertical stack, it is to be understood, of course, that these controllers will function upside down or laid on their sides. Therefore, the terms "top" and "bottom" and the term "vertical," as referring to the axis of the controller, are to be interpreted by reference to the drawings and the accompanying description, and if the controller is turned upside down, the section 106 which has heretofore been referred to as the "top section" will be underneath and the relay section 101 will be at the top, and the proportioning section 103 will be above and the reset section 105 will be beneath the nozzle and input sections.

By making the threaded tie-rod-receiving holes 396 through-holes and with smallest or innermost thread-diameter thereof slightly greater than (and hence "clearing") the largest diameter of the tie-rods, and then inserting removable helical thread-coils of generally diamond-cross-sectioned spring-wire (sometimes called "Heli-Coil") into the opposite ends of such threaded through-holes 396, the member 157 may be used in its lower or "A" position, while with the omission or removal of such thread-coil inserts the same member 157 may be used in the upper or "B" position where such threaded through-hole becomes the clearance hole 394 (FIGURE 82).

The dial-disc 300 has a second stop 303–D protruding on its opposite side, so related (angularly) to the D-shaped hole therein that when the disc 300 is removed and replaced with the opposite face out, the stop 303–D is properly placed for rotation of the flapper 224 with the striking edge 227 disposed on the opposite side of the pin 285. In this position the control-action is reversed. The disc 300 is correspondingly graduated on its other side. One side of the disc 300 is inscribed "With pen rising, output pressure increases," while its other side is inscribed "With pen rising, output pressure decreases."

In place of the input-section 181 (or 350–R) we may also use a pneumatic-translating motion-input section shown in our co-pending application Serial No. 378,824, filed September 8, 1953, and now abandoned, carrying a measurement-deviation-bellows and a setting-deviation-bellows in operative juxtaposition to each other, the one adapted to receive fluid-pressure proportional to the measurement-deviation and the other adapted to receive fluid-pressure proportional to the setting-deviation, and arranged to convert or translate these two pressures into a single input-motion which is then applied, mechanically, to the edge 227 of the flapper-deflecting plate 226, by connecting the link 268 or the pivot 277 to the connector common to the two bellows (or by affixing the pin 285 to such connector, as in the case of the on-off controller). However, even with such pneumatically-translated input-motions, the nozzle-flapper is actuated by a mechanical-input-motion element or elements.

To complete interchangeability of parts, both ports 202 may be drilled in section 157, the one not required being closed by a self-tapping screw and gasket. Alternatively, the partition-wall 201 may be omitted and the unused opening 200 closed by a plug 326 (FIGURES 14 and 35).

For complete interchangeability, the on-off controller may be assembled with a section 103 to raise the input levers 236 and 250 of this controller to the same height as in the proportional controllers herein shown and described; the section 103 in such on-off controller having no feed-back bellows or diaphragm. This permits such on-off controller to be used with the same links from the setting-pointer-arm and from the measurement-deviation-arm of the recorder as used by the proportional controllers. Similarly, when ratio mechanism shown in FIGURES 83–86 is to be a part of an on-off controller, a section 105 may be included, likewise without a diaphragm therein, so the same link 439 may be used and so that the pivot-hole 455 will be at the center of arc of the slot 437.

If coupling tube 160 of the double feed-back section controllers of FIGURES 1, 2 and 6 is omitted and coupling secured as in controller of FIGURE 3, controller is also separable at juncture of sections 103 and 104 or 104 and 105, or both, without opening either feed-back section. However upper chamber must have time to pressurize to remove coupling backlash.

We claim:

1. A sectional pneumatic controller including a stack of sections, operatively juxtaposed and detachably secured to each other in such stacks, the said sections being reversible within the stack so as to convert the controller from left-hand controller to the right-hand controller or vice versa, one of said sections being an input-and-detector section and at least one of said sections being a feed-back section which is also reversible through a 180° inversion, within the stack, to permit it to be placed above or below said input-and-detector section to reverse the direction of its effect on said input-and-detector section, and at least one of said sections being a partition section reversible through a 180° inversion within in the stack to permit it to be placed either above or below the input-and-detector section in the stack.

2. A sectional pneumatic controller including a relay section, a partition section, a feed-back section, and an input-and-detector section, the wall of the feed-back section facing the input-and-detector section having an aperture therethrough, a feed-back bellows mounted within said feed-back section having an open end thereof affixed to said apertured wall in hermetically sealed relation thereto around said aperture, and a motion-transmitting member extending from the inner closed end of said bellows through said aperture into said input-and-detector section.

3. A sectional pneumatic controller according to claim 2, having a flexure spring carried by said input-and-detector section and thrust members flanking said flexure spring with one of their ends bearing thereagainst and their opposite ends bearing in the aforesaid motion-transmitting member.

4. A sectional pneumatic controller including an input-and-detector section and a pair of opposed feed-back sections flanking said input-and-detector section, each of said feed-back sections having an apertured wall facing the input-and-detector section, a bellows in each of said feed-back sections having an open end thereof affixed to the inner surface of said wall and hermetically sealed thereto around said aperture, and a bellows-coupling and motion-transmitting member intermediate the inner closed ends of said bellows and extending through said apertures and through the input-and-detector section.

5. A sectional pneumatic controller according to claim 4, having a flexure spring mounted in the input-and-detector section, and thrust members flanking said spring and having one of their ends bearing thereon with their other ends bearing against the opposite ends of said motion-transmitting member.

6. A sectional pneumatic controller having an input-and-detector section, a feed-back section, and a partition section, and a pneumatic diaphragm mounted between said feed-back section and said partition section and constituting a flexible and pressure-responsive wall therebetween; said feed-back section being disposed between said input-and-detector section and said partition section and said input-and-detector section being pneumatically connected with said feed-back section and said diaphragm.

7. A sectional pneumatic controller including an input-and-detector section, a feed-back section haivng a bellows mounted therein so that its outer surface is exposed to the pressure within said feed-back section, a partition section, and a flexible diaphragm mounted between the feed-back section and the partition section and responsive to the pressure within both the feed-back section and the partition section and serving to modify the pressure within the feed-back section responsive to relatively high-frequency changes in the pressure imposed upon the other side of the diaphragm.

8. A sectional pneumatic controller having an input-and-detector section, a feed-back section, and a relay-valve section, and a pneumatic diaphragm removably mounted between said feed-back section and said relay-valve section and constituting a flexible and pressure-responsive wall therebetween; said feed-back section being disposed between said input-and-detector section and said-relay-valve section and said input-and-detector section being pneumatically connected with said feed-back section and said relay-valve section and said diaphragm.

9. A sectional pneumatic controller including an input section and a detector section in operative juxtaposition to each other and spaced from each other, a detector-nozzle carried by said detector section, sections flanking and common to said input section and said detector section and bridging the space therebetween, at least one of said flanking sections being a pneumatic section, pneumatic passageways in said detector section and in said last-mentioned flanking section in registration with each other and leading to the detector nozzle of the detector section.

10. A sectional pneumatic controller including an input section and a detector section in operative juxtaposition to each other and spaced from each other, a detector-nozzle carried by said detector section, sections flanking and common to said input section and said detector section and bridging the space therebetween, at least one of said flanking sections being a pneumatic section, pneumatic passageways in said detector section and in said last-mentioned flanking section in registration with each other and leading to the detector nozzle of the detector section, registering and coacting dowel pins and holes in said input-and-detector sections and in said flanking sections, respectively, and fastening means extending through some of said sections into others, detachably to secure said sections in a rigid stack.

11. A sectional pneumatic controller having a relay-valve section, an input-detector section including a detector-valve, and a feed-back section, said sections being arranged in a stack in relation to each other and in operative alignment and detachably connected with each other, said relay-valve section containing an output-valve, an air-supply-passageway leading to the receiving-side of said output-valve and an output-air-passageway leading from the discharge-side of the output-valve, a pressure-responsive element operatively connected with said output-valve for variably setting the latter, and a restricted air-passageway extending from said air-supply-passageway to said pressure-responsive element and to said detector-valve, said input-and-detector section containing a compound linkage for varying the setting of said detector-valve, said compound linkage having two motion-input levers, one of said levers being pivoted to the frame member of the input section and the other of said levers being pivoted to the former lever at a point thereon offset from its point of pivotation on said frame member, a resultant-motion link connected with the last-mentioned lever for transmitting the resultant of the motions of said two levers to the detector-valve, said input-and-detector section also containing feed-back linkage connected with the aforementioned resultant-motion link to modify the effect thereof upon the detector-valve, said feed-back section including a pressure-responsive feed-back element connected with said feed-back linkage, and an air-passageway pneumatically connecting said pressure-responsive feed-back element with the output side of said relay-valve, said relay section, said input-and-detector section and said feed-back section having air-passages therein, together forming an air line from said pressure-responsive element of the relay-valve to the detector-valve, and having air-passages therein for impressing the output air from said relay-valve on said pressure-responsive feed-back element; the respective air-passages registering with each other at the contiguous faces of said sections, and tie-rod screws extending from one section into an adjoining section through each end of said controller, whereby the removal of some but less than all of said tie-rod screws will fully release one of the sections from the others without releasing the other sections from each other.

12. A sectional pneumatic controller having a relay-valve section including an output-air-valve, a pneumatic chamber therein for an air-pressure-responsive valve-control element, and an air-pressure-responsive valve-control element controlling said output-air-valve arranged to have compressed air supplied thereto, an input-and-detector section including a detector-valve for venting the compressed air from said pneumatic chamber so as to release the effective compressed air on said air-pressure-responsive valve-control element, thereby to reduce the pressure thereon and thus to pass the output-air-supply through said relay-valve, compound motion-input linkage whose resultant motion is in a direction transverse of the valve-face of said detector-valve and arranged variably to open said detector-valve by the resultant motion thereof, a pneumatic feed-back actuator so interconnected with said linkage that its motion tends to neutralize the resultant motion of said linkage; said relay-valve, said input linkage and detector-valve, and said pneumatic feed-back actuator each being separately housed within a separate section of the composite housing of said sectional controller, said housing sections having air-passageways therein registering at the junctures of said sections, thereby to connect the detector-valve with the air-pressureresponsive valve-control element of said relay-valve and to connect the output-side of said output-valve of said relay with said pneumatic feed-back actuator.

13. A sectional pneumatic controller having a sectional housing including a pneumatic relay housing section and a housing section having a motion-input-operated pneumatic detector-valve, said housing sections having air-passageways therein in registration with each other at the juncture-surfaces of the adjacent sections, which passageways interconnect said detector-valve with said relay, said housing sections having a plurality of registering tie-receiving apertures extending therethrough from one section into another adjacent section, tie members extending through said apertures and detachably securing adjacent sections to each other in a straight-line stack, in operative relation to each other.

14. A sectional pneumatic controller including a detector section, a detector-valve carried by said detector section, a measurement-input section, means carried thereby for deflecting said detector-valve responsive and in proportion to a measurement impressed on said controller, said detector-section and said measurement-input section being juxtaposed to each other in a direction transverse of the axis of the controller, a top section above and common to said detector section and to said measurement-input section, and a pneumatic relay beneath and common to said detector section and said measurement-input section, said relay and said measurement-input section having registering air-passageways therein operatively connecting said detector-valve with said pneumatic control.

15. A sectional pneumatic controller including a detector section, a detector-valve carried by said detector section, a measurement-input section, means carried by said measurement-input section for deflecting said detector-valve responsive and in proportion to a measurement impressed on said controller, said detector section and said measurement-input section being juxtaposed to each other in a direction transverse of the axis of the controller, a partition section beneath and common to said detector section and to said measurement-input section, a top section above and common to said detector section and to said measurement-input section, and a pneumatic relay beneath said partition section, said partition section and said detector section having registering air-passageways therein operatively connecting said detector-valve with said pneumatic relay.

16. A sectional controller including a detector section, a measurement-input section, said two sections being juxtaposed to each other in a direction transverse of the axis of the controller, a pneumatic relay section at one end of the aforementioned two juxtaposed sections and common thereto and detachably secured thereto, and a relay-valve in said relay section, said pneumatic-relay section and said detector section having registering air passageways therein operatively interconnecting said detector-valve with said relay-valve.

17. A pneumatic controller including a detector-nozzle and a movable detector-valve element in operative juxtaposition thereto for varying the escape of compressed air from said nozzle, a set-point-measurement element and a deviation-measurement element connected with each other and a resultant-motion element connected with at least one of said measurement elements for variably moving said detector-valve-element in proportion to the resultant of the motions of said set-point-measurement element and of said deviation-measurement-element, a feed-back mechanism for variably moving said detector-valve element, and connected with said resultant-motion element so as to tend to neturalize the motion of the latter, the valve-affecting motion of said resultant-motion element and the valve-affecting motion of said feed-back mechanism being transverse to each other and each being transverse to the direction of the motion of said detector-valve element.

18. A sectional pneumatic controller including a detector section for operatively carrying a detector nozzle, and a motion-input section for operatively carrying motion-input mechanism, each of said sections having pneumatic passageways therein and assembly holes therethrough and being so arranged that each of said sections can be rotated 180°, about an axis at a right angle to the axis of the controller, so as to permit the disposition of the motion-input mechanism, either on the left side or the right side of the controller, as may be desired.

19. A sectional pneumatic controller including a motion-input-housing-section and a detector-valve housing-section, said two housing-sections being substantially identical with each other, in that each contains the pneumatic passageways, assembly holes and elements for alternatively supporting either input-motion mechanism or detector-valve mechanism, and said sections being interchangeable with each other, alternatively to constitute a motion-input housing-section or a detector-valve housing-section of the controller.

20. A sectional pneumatic controller including a plurality of sections arranged in a straight-line stack and detachably secured to each other, the several sections of said controller having pneumatic passageways therethrough, with the passageways of one section registering with the passageways of an adjacent section, the aforementioned passageways in each section being disposed symmetrically on opposite sides of a plane passing through the several sections, but such plane of symmetry of one section being at a right angle to such plane of symmetry of the other section.

21. A sectional pneumatic controller having a detector section and a feed-back section, each of said sections having a plurality of pneumatic passageways therein, with the passageways of one section registering with the passageways of the other section at the juncture of said two sections, the aforementioned passageways in each section being disposed symmetrically on opposite sides of a plane passing through both sections, but with such plane of symmetry of one section at a right angle to such plane of symmetry of the other section.

22. A sectional pneumatic controller including an input-and-detector section and a pneumatic section including air-pressure-responsive means, said input-and-detector section having pneumatic passageways therein and said pneumatic section having pneumatic passageways therethrough, at least one of which passageways in said pneumatic section being in registration with corresponding pneumatic passageway in said input-and-detector section, each of said sections having tie-rod-receiving apertures therethrough, such apertures in one section being in registration with such apertures in the other section, and tie-rods extending through said apertures, detachably to secure said sections to each other in a stack, the pneumatic passageways which extend through said pneumatic section being distributed and disposed symmetrically on opposite sides of a plane passing through both said sections, and said tie-rod-receiving apertures extending through said sections being distributed and disposed, in each section, symmetrically on opposite sides of a plane passing through both sections.

23. A sectional pneumatic controller including an input-and-detector section and a pneumatic section including air-pressure-responsive means, said input-and-detector section having pneumatic passageways therein and said pneumatic section having pneumatic passageways therethrough, at least one of which passageways in said pneumatic section being in registration with corresponding pneumatic passageway in said input-and-detector section, each of said sections having tie-rod-receiving apertures therethrough, such apertures in one section being in registration with such apertures in the other section, and tie-rods extending through said apertures, detachably to secure said sections to each other in a stack, the pneumatic passageways which extend through said pneumatic section being distributed and disposed symmetrically on opposite sides of a plane passing through both said sections, and said tie-rod-receiving apertures extending through said sections being distributed equally and symmetrically on opposite sides of each of two planes which are transverse to each other and each of which planes passes through both sections.

24. A sectional pneumatic controller including a plurality of sections detachably secured to and generally in line with each other and forming a stack, at least one of which sections is reversible in said stack by a 180° inversion of such section in the stack, so that either side of said section may alternatively be disposed on the left side or the right side of the stack, so as to permit the controller to be used either as a left-hand controller or as a right-hand controller in respect to either its measurement-input means or in respect to its dials.

25. A sectional pneumatic controller including a stack of sections operatively related and detachably secured to each other, having pairs of alternate pneumatic passageways therein and having pairs of apertures therethrough for receiving tie rods for detachably securing the sections to each other, said passageways and said apertures being distributed and disposed symmetrically on opposite sides of planes of symmetry passing through several sections, so that some of said sections may be reversed, by 180° inversion, within the stack, so as optionally to form either a right hand controller or a left hand controller, said controller including an input-and-detector section and a pneumatic section adapted to receive and to house an air-pressure-responsive element operative upon said input-and-relation to said input-and-detector section as to permit it optionally to be placed above or below said input-and-detector section, in the stack, for reversing the direction of its effect upon the input-and-detector section.

26. A sectional pneumatic controller including a plurality of tie-rod-receiving holes extending therethrough, through which tie-rods may be freely extended, and intermediate sections having also threaded openings therein, and tie-rods of different lengths having their inner ends threaded, extending inwardly, into the stack, from each end thereof, to different distances in said stack, and threaded into different sections of said stack; at least some of the intermediate sections having at least one tie-rod passing therethrough without threaded engagement therewith and having at least one tie-rod threaded thereinto, whereby said sections may be separated from each other at least at one juncture-plane thereof without separating said sections at another juncture-plane thereof.

References Cited in the file of this patent
UNITED STATES PATENTS

| | | |
|---|---|---|
| 1,973,769 | Lehn | Sept. 18, 1934 |
| 2,360,889 | Philbrick | Oct. 24, 1944 |
| 2,427,235 | Smoot | Sept. 9, 1947 |
| 2,517,051 | Swenson | Aug. 1, 1950 |
| 2,542,260 | Poole et al. | Feb. 20, 1951 |
| 2,585,347 | Robins | Feb. 12, 1952 |
| 2,596,366 | Brockett | May 13, 1952 |
| 2,619,104 | Temple | Nov. 25, 1952 |
| 2,661,725 | Bowditch | Dec. 8, 1953 |
| 2,711,754 | McKinney | June 28, 1955 |
| 2,712,321 | Grogan | July 5, 1955 |
| 2,724,398 | Higgins | Nov. 22, 1955 |
| 2,749,927 | Grogan | June 12, 1956 |
| 2,769,453 | Dubois | Nov. 6, 1956 |
| 2,774,367 | Grogan | Dec. 18, 1956 |

FOREIGN PATENTS

| | | |
|---|---|---|
| 544,753 | Great Britain | Apr. 27, 1942 |
| 568,634 | Great Britain | Apr. 13, 1945 |

OTHER REFERENCES

Moore Products Co., Phila. Pa., Instructions 505-S for Nullmatic Controller Models 50 and 55, 1947–48, pages 1–7, 16, 20. Copy in 137–86.